(12) United States Patent
Penfield et al.

(10) Patent No.: US 7,142,532 B2
(45) Date of Patent: Nov. 28, 2006

(54) SYSTEM AND METHOD FOR IMPROVING COMMUNICATION BETWEEN A SWITCHED NETWORK AND A PACKET NETWORK

(75) Inventors: Robert F. Penfield, Concord, MA (US); Patrick J. MeLampy, Pepperell, MA (US); Peter S. Commerford, Belmont, MA (US)

(73) Assignee: Acme Packet, Inc., Burlington, MA (US)

( * ) Notice: Subject to any disclaimer, the term of this patent is extended or adjusted under 35 U.S.C. 154(b) by 1005 days.

(21) Appl. No.: 10/000,409

(22) Filed: Nov. 2, 2001

(65) Prior Publication Data
US 2003/0091026 A1 May 15, 2003

Related U.S. Application Data

(63) Continuation-in-part of application No. 09/941,229, filed on Aug. 28, 2001, and a continuation-in-part of application No. 09/911,256, filed on Jul. 23, 2001, and a continuation-in-part of application No. 09/911,304, filed on Jul. 23, 2001.

(51) Int. Cl.
*H04L 12/66* (2006.01)
(52) U.S. Cl. .................. 370/352; 370/401; 370/466; 370/467
(58) Field of Classification Search .............. None
See application file for complete search history.

(56) References Cited

U.S. PATENT DOCUMENTS 6,084,956 A * 7/2000 Turner et al. ............... 379/230
6,807,150 B1 * 10/2004 McNiff et al. .............. 370/230
6,934,279 B1 * 8/2005 Sollee et al. ................ 370/352
2002/0154646 A1 * 10/2002 Dubois et al. .............. 370/406
2002/0159439 A1 * 10/2002 Marsh et al. ............... 370/352

OTHER PUBLICATIONS

Schulzrinne et al., "RTP: A Transport Protocol for Real-Time Applications," Network Working Group, Jan. 1996, pp. 1-66.
Swale et al., "Requirements for the MIDCOM Architecture and Control Language," MIDCOM Working Group, Internet Draft, Feb. 2001, p. 1-24.
Srisuresh et al., "Middlebox Communication Architecture and Framework," Network Working Group, Internet Draft, Feb. 2001, pp. 1-37.
Martin et al., "SIP Through NAT Enabled Firewall Call Flows," Midcom Working Group, Internet Draft, Feb. 2001, pp. 1-63.

(Continued)

*Primary Examiner*—Chau Nguyen
*Assistant Examiner*—Rhonda Murphy
(74) *Attorney, Agent, or Firm*—Thomas, Kayden, Horstemeyer & Risley, LLP

(57) ABSTRACT

A system and method for improving communication between a switched network and a packet network is disclosed. In a simplified embodiment, a signaling gateway is utilized for converting signaling in a first protocol into a second protocol, and from the second protocol to said first protocol. At least one media gateway is utilized for converting multimedia provided in a first format into a second format, and from the second format into the first format. A session router for selecting at least one multimedia transmission route to a destination is also utilized, wherein the destination is specified by the switched network. In addition, a media router is also utilized for guiding the multimedia to the destination after conversion by the media gateway.

44 Claims, 18 Drawing Sheets

OTHER PUBLICATIONS

Rosenberg et al., "Getting SIP through Firewalls and NATs," Internet Engineering Task Force, Internet Draft, Feb. 22, 2000, pp. 1-57.

Eliot Lear, "A Middle Box Achitectural Framework," Network Working Group, Internet Draft, Jan. 31, 2001, pp. 1-12.

Rosenberg et al., "SIP Traversal through Residential and Enterprise NATs and Firewalls," Internet Engineering Task Force, Internet Draft, Mar. 2, 2001, pp. 1-41.

Carpenter et al., "Middleboxes: Taxonomy and Issues," The Internet Society, Internet Engineering Task Force, Internet Draft, Apr. 2001, pp. 1-24.

B. Biggs, "A SIP Application Level Gateway for Network Address Translation," Internet Draft, Mar. 2000, pp. 1-16.

Kuthan et al., "Middlebox Communication: Framework and Requirements," Internet Engineering Task Force, Internet Draft, Nov. 2000, pp. 1-23.

P. Srisuresh, "Framework for Interfacing with Network Address Translator," NAT Working Group, Internet Draft, Apr. 2000, pp. 1-58.

Mart et al., "Firewall Control Requirements," MidCom Bof, Internet Draft, Nov. 2000, pp. 1-16.

Melinda Shore, "H.323 and Firewalls: Problem Statement and Solution Framework," Internet Draft, Feb. 3, 2000, pp. 1-19.

Thernelius et al., "SIP Firewall Solution," SIP Working Group, Internet Draft, Jul. 2000, pp. 1-32.

N. Freed, "Behavior of and Requirements for Internet Firewalls," Network Working Group, Internet Draft, Oct. 2000, 1-14.

D. Newman, "Benchmarking Terminology for Firewall Performance," Network Working Group, The Internet Society, Aug. 1999, pp. 1-51.

F. Finlayson, "IP Multicast and Firewalls," Network Working Group, The Internet Society, May 1999, pp. 1-23.

S. Bellovin, "Firewall-Friendly FTP," Network Working Group, Feb. 1994, pp. 1-7.

Montenegro et al., "Sun's SKIP Firewall Traversal for Mobile IP," Network Working Group, The Internet Society, Jun. 1998, pp. 1-45.

Gaynor et al., "Firewall Enhancement Protocol (FEP)," Network Working Group, The Internet Society, Apr. 1, 2001, pp. 1-22.

Dr. Andrew Molitor, "A Firewall Solution for Voice Over IP," Aravox Report, Aravox Technologies, pp. 1-2.

"Aravox Firewall Benefits," Aravox Technologies, pp. 1-9.

Dr. Andrew Molitor, "Can Voice Over IP Work Without Dynamic NAT?," Aravox Report, Aravox Technologies, pp. 1-2.

Dr. Andrew Molitor, "Deploying a Dynamic Voice over IP Firewall with IP Telephony Applications," Aravox Report, Aravox Technologies, pp. 1-5.

Dr. Andrew Molitor, "Firewall Control for IP Telephony," Aravox Report, Aravox Technologies, pp. 1-5.

Molitor et al., "High Performance H.323 Firewalling for VoIP Solutions," Aravox Report, Aravox Technologies, pp. 1-2.

"What is Unique about IP Telephony?," Aravox Technologies, Spring 2001 IT Expo, pp. 1-16.

Dr. Andrew Molitor, "Securing VoIP Networks with Specific Techniques, Comprehensive Policies and VoIP-Capable Firewalls," Aravox Report, Aravox Technologies, pp. 1-3.

Utz Roedig, "Security Analysis of IP-Telephony Scenarios," Presentation by Darmstadt University of Technology, pp. 1-28.

Fredrik Thernelius, "SIP, NAT, and Firewalls," Master Thesis, Ericsson, May 2000, pp. 1-69.

Steven M. Bellovin, "Distributed Firewalls";login: Magazine, Nov. 1999, pp. 37-39 (1-10).

"Firewall ActiveX Control for Microsoft Windows," Distinct Corporation, 1998, pp. 1-45.

Jiri Kuthan, "Firewall Control," Flow Processing Control Protocol, p. 1-3.

Alan Crosswell, "Advanced Networking Information," Columbia University Academic Information Systems, Mar. 21, 2000, p. 1-22.

"Cisco Secure PIX Firewall Software v5.2," Cisco Data Sheet, pp. 1-7.

"Cisco Secure PIX 500 Firewalls," Cisco Products & Technologies, 2000, pp. 1-3.

"Cisco Secure PIX Firewall," Internet Product Watch, Apr. 12, 2001, pp. 1-2.

"Media Firewall," www.marconi.com, 2000, pp. 1-4.

"Media Firewall," www.marconi.com, 2001, pp. 1-3.

"ATM Switch Network Modules: LAN, WAN, and Service Interfaces for TNX-210, TNX-1100, ASX-200BX, ASX-1000 and ASX-1200 ATM Switches," www.marconi.com, 2000, pp. 1-12.

"Marconi's Next Generation IP and Multi-Service Switch Router Enables End-to-End Differentiated Services," www.marconi.com, Nov. 6, 2000, pp. 1-3.

"Transforming Communications and Information with Enterprise-Focused Ethernet Solutions," www.marconi.com., pp. 1-6.

"Marconi Expands Networking Product Portfolio with Solutions for Emerging Enterprise Needs," www.marconi.com, Jul. 24, 2000, pp. 1-2.

"Marconi to Showcase 'Smart and Fast' Switch/Router at CeBIT," www.marconi.com, Jan. 22, 2001, pp. 1-2.

"Marconi Demonstrates Converged Distance-Learning Solutions at Educause 2000," www.marconi.com, Oct. 10, 2000, pp. 1-2.

"Firewall Security," www.marconi.com, Oct. 30, 2000, pp. 1-2.

"SA-400, IP/ATM Firewalling for ATM Networks," www.marconi.com, 2000, pp. 1-4.

"Media Firewall," www.marconi.com, 2001, pp. 1-3.

"NSX-9500, Routing, LANE, and Firewalling Services for ATM Backbone Networks," www.marconi.com, 2000, pp. 1-4.

"The New Public Network: Scalable, Flexible, PSTN Features, IN Features, Signalling Gateway," www.marconi.com, 1999, pp. 1-4.

"Sphericall Voice Internetworking Multiplexer (VIM) Product Overview," www.marconi.com, 2001, p. 1.

"ServiceOn Accountant 2.0: Per-call Usage Based Billing for Differentiated Services," www.marconi.com, Dec. 12, 2000, pp. 1-2.

"Marconi Extends Optical Networking; Introduces Advanced Multiservice Platform," www.marconi.com, Jun. 6, 2000, pp. 1-2.

"ATM Switched Network Modules Product Overview," www.marconi.com, 2001, pp. 1-4.

"Security is the Key," Marconi Interface, May 2000, p. 30.

"Firewall Switching Agent," www.marconi.com, 2001, pp. 1-4.

"ESX-2400 and ESX-4800 Firewall Accelaration Switches," www.marconi.com, 2001, pp. 1-8.

"ESX-2400 and ESX-4800 Product Overview," www.marconi.com, 2001, pp. 1-3.

"FSA Product Overview," www.marconi.com, 2001, pp. 1-2.

Parthenios, "Hackers Beware," Telephony, Jun. 18, 2001, pp. 1-2.

"Aravox Expands IP Platform to Include VoIP," CommWeb.com, May 30, 2001, p.1.

"Aravox Expands IP Network Services Platform to Carriers and xSP's Deploying VoIP," biz.yahoo.com., May 29, pp. 1-2.

"Aravox Expands IP Network Services Platform to Carriers and Service Providers Deploying VoIP,". TMCnet.com, May 29, 2001, pp. 1-2.

"Solutions,": www.aravox.com/solutions, 2001, p.1.

"The Aravox Network Services Platform Solution for Backbone Carriers," www.aravox.com/backbone, 2001, p.1.

"The Aravox Network Services Platform Solution for Access Providers," www.aravox.com/access, 2001, p.1.

"The Aravox Network Services Platform Solution for Enterprises," www.aravox.com/enterprise, 2001, p. 1.

"SIP ALG for Firewall Traversal (Application Level Gateway)," www.microappliances.com, 2000, p.1.

"SIP Firewall/Outbound Proxy Server (ALG)," www.microappliances.com, 2000, p.1.

"Microappliances SIP Phone (ActiveX)," www.microappliances.com, 2000, p.1.

"Convergence Data and Telephony Platform," www.microappliances.com, 2000, p.1.

Article entitled "UMTS all-IP Mobility Management, Call and Session Control Procedure" by Napolitano, A., et al., dated Mar. 24, 2000-Internet Draft; located at URL:http://195.103.28.224/ricagni/draft-ricagni-megaco-umts-all-ip-00.pdf, Document No. XP-002149519; pp. 1-24.

Article entitled "Draft-ietf-sipe=isup-03.txt: ISUP to SIP Mapping" by Gonzalo Camarillo, Adam Roach and Jon Peterson, dated Aug.

2001-Internet Draft; located at URL:http://www.watersprings.org/pub/id/draft-ietf-sip-isup-03.txt, Document No. XP002254297, pp. 1-55.

Article entitled "3GPP TS 23.207 V5.1.0 (Oct. 2001): Technical Specification Group Services and System Aspects; End-to-End QoS Concept and Architecture; (Release 5)" by 3rd Generation Partnership Project; located at URL:ftp://ftp.3gpp.org/Specs/archieve/23_series/23.207/, Document No. XP002254299, pp. 1-50.

* cited by examiner

SYSTEM AND METHOD FOR IMPROVING COMMUNICATION BETWEEN A SWITCHED NETWORK AND A PACKET NETWORK

CROSS-REFERENCE TO RELATED APPLICATIONS

This application is a continuation-in-part of U.S. patent application entitled, "System and Method for Determining Flow Quality Statistics for Real-Time Transport Protocol Data Flows," filed on Jul. 23, 2001, and having Ser. No. 09/911,256; U.S. Application entitled, "System and Method for Providing Rapid Rerouting of Real-Time Multimedia Flows," filed on Jul. 23, 2001, and having Ser. No. 09/911,304; and U.S. patent application entitled, "System and Method for Providing Encryption for Rerouting of Real-Time Multimedia Flows," filed on Aug. 28, 2001, and having Ser. No. 09/941,229, all of the foregoing disclosures of which are incorporated by reference herein in their entirety.

FIELD OF THE INVENTION

The present invention generally relates to telecommunications and, more particularly, is related to a system and method for improving communication between a switched network and a packet network.

BACKGROUND OF THE INVENTION

The public switched telephone network (PSTN) has evolved into an efficient real-time, multimedia communication session tool wherein users can pick up any one of nearly one billion telephones and dial any one of nearly one billion endpoints. Several developments have enabled this automated network, such as numbering plans, distributed electronic switching and routing, and networked signaling systems.

Similar to the manner in which the PSTN is based on a hierarchy, the Internet is based on an Internet protocol (IP). IP messages are routed or forwarded from one link to the next (i.e., from a source of a data flow to a destination of the data flow). Each IP packet contains an IP address, which, in Internet protocol version 4 (IPv4), for example, has 32 bits. Each IP address also has a certain number of bits dedicated to a network portion and a certain number of bits dedicated to a host portion.

IP routers are used to take a data packet from one network (or link) and place it onto another network (or link). Tables are located within IP routers that contain information or criteria used to determine a best way to route the data packet. An example of this information may be the state of network links and programmed distance indications. By using intelligent devices on both sides of a network domain, it is possible to allocate a temporary address to route a packet through a network and restore the original address on the far side of the network when the packet leaves the network. This is the basis for many current virtual private network (VPN) products and is understood in the art.

To ensure that the network elements (e.g., switches in the telephone network, routers in the data network) can perform their associated tasks, it helps for the network elements to know the status of adjacent communication links and available routes; signaling systems are used to provide this information. In telephone networks, signaling systems used are either signaling system number 7 (SS7) or are equivalent to SS7. An SS7 network is separate from a voice network and is used for the purpose of switching data messages pertaining to the business of connecting telephone calls and maintaining the signaling network. In addition, the SS7 digital signaling standard is utilized to interface the PSTN to the IP world. As is known by those skilled in the art, SS7 utilizes a message structure wherein messages travel from one network entity to another, independent of the actual voice and data to which the messages pertain. This message structure utilizes an envelope, referred to as a packet, for traversing messages.

Due to most current telecommunication endpoints receiving service through a PSTN-based system, a gateway is used to facilitate a multimedia packet flow between a packet data network and a PSTN. It should be noted that multimedia comprises voice, data, and/or discrete media. Gateways are installed at edges between data networks and voice networks, wherein the gateways are used to convert multimedia (and signaling) to ensure communication.

One specific type of gateway is the media gateway. The media gateway converts multimedia provided in one type of network to the format required in another type of network. For example, a media gateway could terminate bearer channels from a switched circuit network and media streams from a packet network (e.g., real time protocol (RTP) streams in an IP network). A media gateway may be capable of processing audio, video and T.120, alone or in any combination, and is capable of full duplex media translations. The media gateway may also play audio/video messages and perform other interactive voice response (IVR) functions, or may perform media conferencing.

There are several strategies for routing calls between gateways that are known in the art. Two of these strategies are full mesh routing and hierarchical routing. Full mesh routing is the standard method described in most of the softswitching architectures. Session initiation protocol (SIP) is the inter-softswitch signaling system because it supports an anywhere-to-anywhere signaling model. In this model, softswitches have a virtual connection to other softswitches for completing calls.

Softswitches, otherwise referred to as call agents or media gateway controllers, manage the gateways located within a network. The softswitch may use a media gateway control protocol to communicate with the gateways. Specifically, the media gateway control protocol runs between the softswitch and the gateways in a packet telephony network. Among the many functions of softswitches, softswitches control the part of a call state that pertains to connection control for media channels in a media gateway.

Gateways are expected to execute commands sent by the softswitches via use of the media gateway control protocol. Typically, these commands include the translation between audio signals and the packet network. Unfortunately, when running a network that comprises many softswitches, the owner of the network has many different points of policy management that need to be maintained to create a full mesh. Such policy management issues include assuring that each softswitch knows the IP address of each other softswitch and what telephone numbers or PSTN to which they connect. When running softswitches from multiple vendors, further management issues arise. The management issues are then more complicated due to the fact that the equipment may be managed through different interfaces.

When the number of softswitches deployed grows large, the sharing of different routes is likely. In the full mesh routing arrangement, the routing of calls may be difficult since several different egress softswitches may be full or not functioning. For example, if a carrier has thirty softswitches that can handle national long distance, and the network is running at about 50% full, then each originating softswitch will likely have to try an average of fifteen (15) separate softswitches before finding one with a non-blocked route. This search effort can be greatly reduced if a purely random distribution is implemented, however, it is assumed that some routes would be preferred over others due to cost or quality, thereby exacerbating the problem. In addition, the excessive functionality of softswitches, as is demonstrated by, for example, the excessive use of state sharing, causes a decrease in the flow of information (data and/or voice).

SUMMARY OF THE INVENTION

In light of the foregoing, the present invention generally relates to systems and methods for improving communication between a switched network and a packet network.

Generally, with reference to the structure of the communication system, the system utilizes a signaling gateway for converting signaling in a first protocol into a second protocol, and from the second protocol to the first protocol. At least one media gateway is utilized for converting multimedia provided in a first format into a second format, and from the second format into the first format. A session router is utilized for selecting at least one multimedia transmission route to a destination, wherein the destination is specified by the switched network and is located within the packet network. A media router is also utilized by the communication system for guiding the multimedia to the destination after conversion by the media gateway.

The present invention can also be viewed as providing one or more methods for establishing a call from a switched network to a user agent, wherein the user agent is located within a packet network. In this regard, one such method, among others, can be broadly summarized by the following steps: transmitting an initial address message from the switched network to a signaling gateway; converting with the signaling gateway the initial address message to a session Internet protocol invite message; transmitting the Internet protocol invite message to a session router, which analyzes the Internet protocol invite message to determine a best route to the user agent; and opening a media router address and port, within a media router, for multimedia transmission from the user agent to said switched network, as a result of a request from said session router, wherein the media router is capable of guiding the multimedia to the user agent.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

Figure 1:
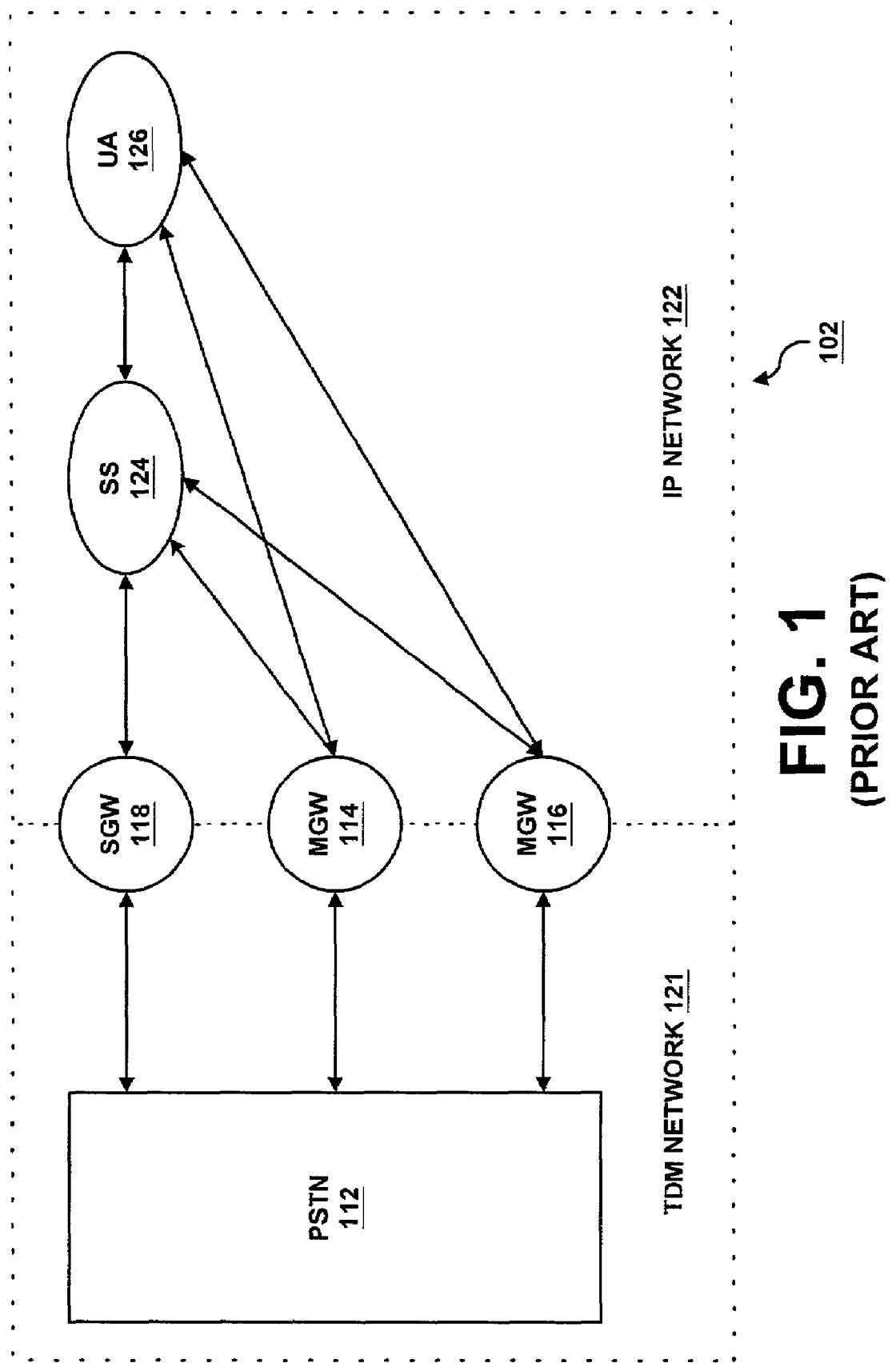
FIG. 1 is a block diagram of a prior art communication network.

Referring now to the drawings, wherein like reference numerals designate corresponding parts throughout the drawings, FIG. 1 is a block diagram illustrating a prior art communication network 102. As is shown by FIG. 1, the prior art communication network 102 comprises a PSTN 112, located within a time division multiplexing (TDM) network 121, that is in communication with a user agent 126 located within an IP network 122, as is further described hereinbelow. It should be noted that the IP network 122 may instead be any packet data network. The PSTN 112 segments signaling data and voice on the network 102, thereby allowing for performance guarantees of different traffic components to be set independently.

To allow a call made on a traditional circuit to be recast in IP packets, and vice versa, a first and second media gateway 114, 116 are utilized by the prior art communication network 102. It should be noted that the number of media gateways may be less or more in accordance with the requirements of the communication network utilizing the gateways.

The first media gateway 114 and the second media gateway 116 are connected to the PSTN 112 via a transmission channel. Typically, each individual channel that connects the PSTN 112 to a separate media gateway 114, 116 has a circuit identification code (CIC). CIC is used between signaling points to uniquely identify a particular circuit within a network. In other words, the CIC indicates a trunk circuit reserved by the originating switch (PSTN) to carry a call to a specific RTP port within the network 102.

The media gateways 114, 116 convert multimedia provided in one type of network to the format used in another type of network. Specifically, media gateways 114, 116 perform multimedia mapping and/or transcoding functions between potentially dissimilar networks, one of which is presumed to be a packet, frame or cell network. For example, specific to the illustrated prior art communication network 102, the media gateways 114, 116 convert media from time division multiplexing (TDM) format used by the PSTN 112 in the TDM network 121, to RTP format in the IP network 122. In accordance with the prior art, the media gateways 114, 116 are typically also responsible for determining the destination of received multimedia.

Since the PSTN 112 also provides for signaling between the PSTN and the IP network 122, a signaling gateway (SGW) 118 is located within the network 102, which is connected to the PSTN 112 via at least one channel. As is known in the art, SS7 signaling is utilized by the PSTN 112 for the communication of signaling messages between the PSTN 112 and the SGW 118. The SGW 118 acts as a signaling agent that receives/sends switched circuit network (SCN) native signaling at the edge of the IP network 122. The SGW 118 may relay, translate or terminate SS7 signaling. Typically, the SGW 118 will convert SS7 signaling to SIP signaling, wherein SIP is prevalent in a packet-based network.

SS7 signaling utilizes a message structure wherein messages travel from one network entity to another, independent of the actual voice and data to which they pertain. This message structure utilizes an envelope, referred to as a packet, for traversing the messages. Alternatively, SIP is a signaling protocol for terminating phone calls over the IP network 122, which was designed specifically for the Internet. It not only takes advantage of the manageability of IP, but is architecturally designed to make developing a telephony application nearly as simple as developing a Windows application. In comparison, SIP signaling is similar to Hyper Text Transfer Protocol (HTTP) requests on the Internet.

The SGW 118 is connected to a softswitch 124. As mentioned hereinabove, softswitches, otherwise referred to as call agents or media gateway controllers, manage the media gateways 114, 116 located within the communication network 102. The softswitch 124 controls the part of a call state that pertains to connection control for media channels in the media gateways 114, 116. In addition, the softswitch 124 provides remote resource monitoring for a network level view (e.g., trunk utilization, IP network bandwidth and utilization), and configuration of media transcoding parameters on a media gateway based on call signaling information. Of course, the softswitch 124 may perform other functions not described that are known to those of ordinary skill in the art.

The softswitch 124 may use media gateway control protocol (MGCP) to communicate with the media gateways 114, 116. The media gateways 114, 116 are expected to execute commands sent by the softswitch 124 via use of the MGCP. Typically, these commands include the translation of audio signals and the packet network, among other functions. As a non-limiting example, MGCP may be used to provide the following commands on the softswitch 124: notification request; create a connection; modify a connection; delete a connection; audit an endpoint or connection; and provide configuration of the media gateways 114, 116. In addition, the MGCP may be used to provide the following commands on the media gateways 114, 116: restart a connection; delete a connection; and notification of connections.

Figure 2:
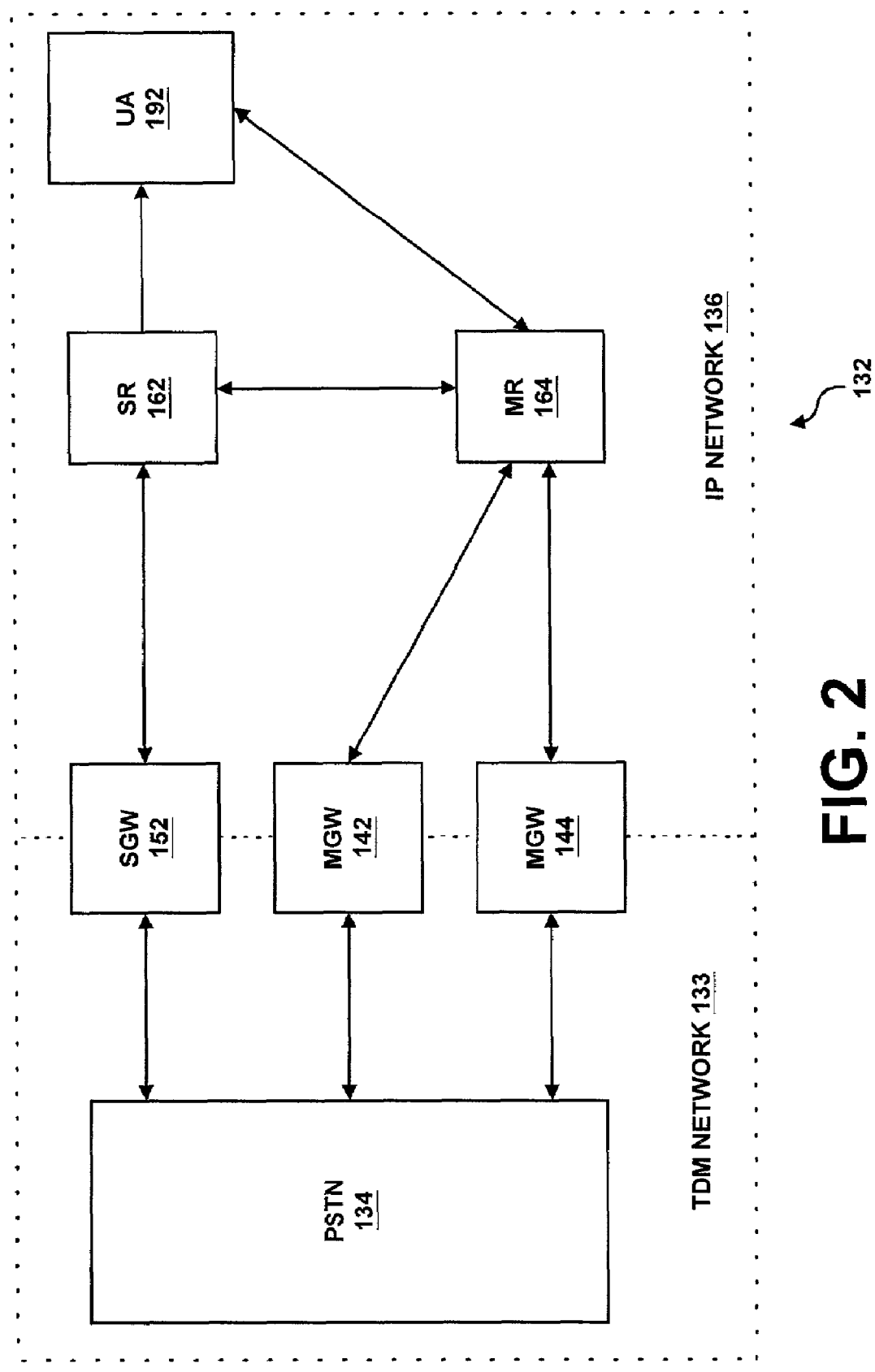
FIG. 2 is a block diagram illustrating an improved communication network in accordance with the preferred embodiment of the invention.

The softswitch 124 and media gateways 114, 116 are connected to a user agent 126, thereby completing paths of communication between the PSTN 112 and the user agent 126. Unfortunately, excessive functionality provided by the softswitch 124, as well as the utilized MGCP, decreases the speed of multimedia flow. The present communication system, which is described in detail hereinbelow, addresses and provides a solution to this inadequacy. FIG. 2 is a block diagram illustrating an improved communication network 132 in accordance with the preferred embodiment of the invention.

Improved Communication Network

As is shown by FIG. 2, the improved communication network 132 comprises a PSTN 134, located within a TDM network 133, that is in communication with an IP network 136, as is further described hereinbelow. The PSTN 134 segments signaling data and voice on the network 132, thereby allowing for performance guarantees of different traffic components to be set independently.

To allow a call made on a traditional circuit to be recast in IP packets, and vice versa, a first and second media gateway 142, 144 are utilized by the improved communication network 132. It should be noted that the number of media gateways may be less or more in accordance with the requirements of the communication network utilizing the gateways.

The first media gateway 142 and the second media gateway 144 are connected to the PSTN 134 via a transmission channel. Typically, each individual channel that connects the PSTN 134 to a separate media gateway 142, 144 has a circuit identification code (CIC). CIC is used between signaling points to uniquely identify a particular circuit, or bearer channel, within a network. In other words, the CIC indicates a trunk circuit, or bearer channel, reserved by the originating switch (PSTN) to carry a call to a specific RTP port within the improved communication network 132.

The media gateways 142, 144 convert multimedia provided in one type of network to the format used in another type of network. Specifically, media gateways 142, 144 perform multimedia mapping and/or transcoding functions between potentially dissimilar networks, one of which is presumed to be a packet, frame, or cell network. For example, specific to the present improved communication network 132, the media gateways 142, 144 convert media from time division multiplexing (TDM) format in the TDM network 133, to RTP format in the IP network 136. However, unlike in the prior art, the media gateways 142, 144 preferably do not determine the destination of received multimedia. Instead, the media gateways 142, 144 are limited to performing conversion. Of course, it is possible to provide traditional media gateways 142, 144 that perform more than just conversion, or the media gateways 142, 144 may be used just for conversion.

In addition, the CIC addresses are programmed into the media gateways 142, 144 so that decision making is not performed by the media gateways 142, 144, and a clear channel, providing continuous transmission of multimedia to a destination, may be provided. Since mere conversion is performed by the media gateways 142, 144, in accordance with the preferred embodiment of the invention, the media gateways 142, 144 may be provided on application specific integrated circuits (ASICs) or other logical devices. These devices are much less complex, much less expensive, and scale to considerable sizes. This is made possible by the fixed destination address for the RTP that flows constantly from the MGW 142, 144 to the MR 164.

Since the PSTN 134 also provides for signaling between the PSTN 134 and the IP network 136, a signaling gateway (SGW) 152 is located within the improved communication network 132, which is connected to the PSTN 134 via at least one channel. SS7 signaling is utilized by the PSTN 134 for the communication of signaling messages between the PSTN 134 and the SGW 152. In accordance with the preferred embodiment of the invention, the SGW 152 converts SS7 signaling to SIP signaling and does not perform other functions. Of course, a traditional SGW 152 may be implemented which performs more than just conversion, or a traditional SGW 152 may be implemented that is merely used for purposes of conversion. It should be noted that, since the SGW 152 and the media gateways 142, 144 merely perform conversion, the speed of multimedia data transmission is greatly increased, as would be understood by one of ordinary skill in the art. Since mere conversion is performed by the SGW 152, the SGW 152 may be provided on an application specific integrated circuit (ASIC) or other logical device.

The SGW 152 comprises a memory that may be used for converting a received circuit identification code (CIC) into a session description protocol (SDP) header comprising an IP address and port for a destination user agent 192 to direct packets to the MGW 142,144. Further description of SDP is provided by the Internet engineering task force Internet draft, named, "SIP: Session Initiation Protocol," having document identification number, ietf-sip-rfc2543bis-02.ps, which is incorporated by reference in its entirety. As is known in the art, a CIC identifies a specific circuit allocated for PSTN transmission. As such, circuit number one may comprise CICs zero through twenty, while circuit number two may comprise CICs twenty-one through forty. In addition, the memory may store a table that associates a specific CIC with a specific MGW IP address and port. Table 1, provided hereinbelow, is an example of a table that may be stored within the MGW 142,144 memory.

TABLE 1

| Circuit ID | CIC Start | CIC End | MGW IP ADDR | Port Start | Port End |
|---|---|---|---|---|---|
| Circuit 1 | 0 | 20 | 132.147.168.2 | 3000 | 3020 |
| Circuit 2 | 21 | 40 | 132.147.168.4 | 3021 | 3040 |

As is shown by Table 1, CICs zero through twenty are used in association with circuit one. These CICs are also associated with a MGW 142 IP address of 132.147.168.2 and MGW ports three thousand (3000) through three thousand and twenty (3020). In addition, CICs twenty-one through forty are used in association with circuit two. These CICs are also associated with a MGW 144 IP address of 132.147.168.4 and MGW ports three thousand and twenty-one (3021) through three thousand and forty (3040). In fact, further explanation of SGW 152 conversion of SS7 to SIP is provided in detail hereinbelow.

The SGW 152 is connected to a session router (SR) 162 that is utilized to process and select multiple routes associated with the transmission of multimedia data packets to a specific destination. Specifically, the SR 162 processes multiple transmission routes, and selects a best transmission route. An example of a session router 162 and its implementation is provided by the co-pending U.S. patent application entitled, "System and Method for Assisting in Controlling Real-time Transport Protocol Flow Through Multiple Networks via Media Flow Routing," by MeLampy, et. al., filed on Jul. 23, 2001, and having Ser. No. 09/911,256 (hereinafter, "the '256 patent application"), the disclosure of which is hereby incorporated by reference in its entirety. The '256 patent application teaches use of a session router to select multiple routes and process the routes in order, selecting from a set of user agents, or session initiation protocol (SIP) agent(s), that are otherwise equal using various distribution strategies.

The media gateways 142, 144 are connected to a media router 164 that is utilized for guiding or steering resulting RTP flows, after conversion by the media gateways 142, 144, to certain destinations or thresholds. The RTP destinations or thresholds have been previously selected and processed by the session router 162, as is explained in further detail hereinbelow. It is desirable to manage the path of the resulting real-time packet (RTP) flow. U.S. patent application entitled, "System and Method for Providing Rapid Rerouting of Real Time Multimedia Flows," by MeLampy, et. al., filed on Jul. 23, 2001, having Ser. No. 09/911,304 (hereinafter "the '304 patent application"), the disclosure of which in hereby incorporated by reference in its entirety, teaches use of media routers for guiding the resulting RTP flows selected and processed by the session router 162 through certain thresholds. It should be noted that the number of media routers may differ in accordance with the requirements of the improved communication network 102.

Figure 3:
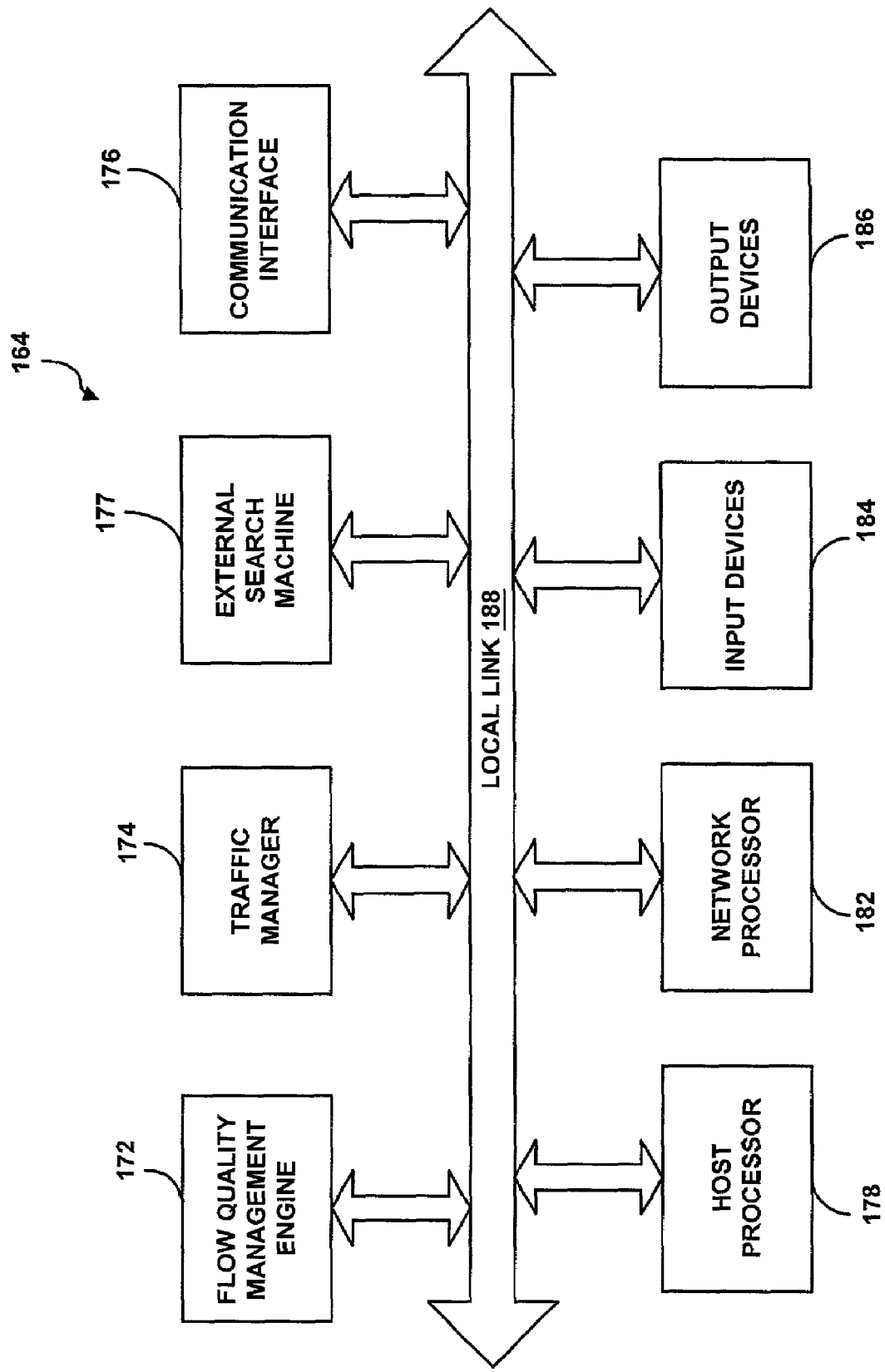
FIG. 3 is a block diagram further illustrating a media router utilized within the improved communication network of FIG. 2.

The introduction of media routers into the real-time multimedia flow forces data packets through a known interface. FIG. 3 is a block diagram further illustrating a media router 164. As is shown by FIG. 3, the media router 164 comprises a flow quality management engine 172, a traffic manager 174, a communication interface 176, a host processor 178, a network processor 182, input devices 184 and output devices 186, all of which communicate within the media router 164 via a local link 188. Each of the above-mentioned are described in detail in the presently pending '304 patent application.

Specifically, the traffic manager 174 is preferably used for measuring and enforcing IP session data flow rates, or traffic, for providing traffic measurement. An example of a commercially available traffic manager 174 is an NPX5700 traffic manager sold by MMC Networks located in California, USA. Essentially, the traffic manager 174 measures the number of data packets that flow through the communication interface 176. The traffic manager 174 works in concert with the network processor 182 such that once a forwarding decision is made, the traffic manager 174 queues the received packet into its respective IP flow and associated priority.

As is known in the art, the traffic manager 174 comprises a memory for temporarily storing received data packets. From an inbound perspective, the media router 164 is able to monitor RTP data flows and enforce maximum data rates by either dropping packets or marking them as eligible for discarding if they are outside a bandwidth allocated for the data flow. The traffic manager 174 may also be instructed by the session router 162 to accept a specific amount of data in accordance with an allocated bandwidth and bit rate. Therefore, if data is received at a higher bit rate than allowed by the session router 162, the data received at the higher bit rate is not transmitted. It should be noted that the characteristics specified by the session router may instead be programmed directly into the media router 164 without using the session router 162.

The flow quality management engine 172 provides translation services within the media router 164, quality measurement services, and detection and correction of upstream and downstream failures. The translation services performed by the flow quality management engine 172 comprise the capability to translate a source address, destination address, source port, destination port or any combination of these fields. The media router 164 is also capable of removing and/or inserting a multi-protocol label switching (MPLS) tag in the IP header of a multimedia data flow packet. In addition, the media router 164 is capable of inserting or modifying a diffserv codepoint located within the IP header of the packet, which, as is known in the art, is used to modify priority of the data packets.

The quality measurement services provided by the flow quality management engine 172, within the media router 164, are provided on a per flow basis, wherein a multimedia data flow is defined by a source IP address, a destination IP address, a source port, and/or a destination port. Quality measurement preferably comprises maintaining current statistics for the flow within the network processor 182, as well as aggregate and min/max statistics for the flow where applicable. Examples of statistics that may be collected include latency, jitter and packet loss for a pre-defined window of time. It should be noted that the window can be identified via the session router 162 or the media router 164. Aggregate statistics may include transmitted packets, dropped packets and duplicate packets. Minimum and maximum statistics, otherwise referred to as boundary statistics, may also be collected which may include latency, jitter and packet loss per window of time. The flow quality management engine 172, within the media router 164, also provides the detection and correction of upstream and downstream failures in the transmission of RTP data packets.

The host processor 178, similar to the traffic manager 174, provides detection and correction of upstream and downstream failures. Methods used by the host processor 178 to detect and correct upstream and downstream failures in the transmission of RTP data packets include, but are not limited to, the use of link failures and external management events. An external search engine 177 is also located within the media router 164 that provides content addressable memory. The external search engine 177 is used to store translations or bindings previously determined by "open/bin" requests for fast access by the network processor 182. Open/bind requests are discussed in detail hereinbelow. The external search engine may also be used to store media access control addresses to IP mappings for cases where the output devices are Ethernet type devices. An example of an external search engine is manufactured and made commercially available by Netlogic Microsystems, Inc, of Mountain View, Calif.

It should be noted that the number of session routers, media routers, signaling gateways, and media gateways may vary from the number shown in FIG. 2. An example of communication via a number of session routers is provided by the U.S. patent application entitled, "System and Method for Assisting in Controlling Real-time Transport Protocol Flow Through Multiple Networks Via Use of a Cluster of Session Routers," by MeLampy, et. al., filed on Apr. 27, 2001, having Ser. No. 09/844,992, the disclosure of which in hereby incorporated by reference in its entirety. In addition, an example of communication via a number of media routers is provided by the U.S. patent application entitled "System and Method for Providing Rapid Rerouting of Real-Time Multimedia Flows," by MeLampy, et. al., filed on Jul. 23, 2001, having Ser. No. 09/911,304, the disclosure of which in hereby incorporated by reference in its entirety.

As is shown by FIG. 2, the session router 162 and the media router 164 are not only connected to each other, but they are also connected to, or proxied to, at least one user agent 192 of a called or calling party. It should be noted that the user agent 192 may be a SIP agent. Communication between the session router 162 and the SGW 152, and between the session router 162 and the user agent 192 is provided via use of SIP signaling. Other types of signaling systems could be considered including H.323 or equivalents. In addition, communication between the media router 164 and the first and second MGWs 142, 144, and between the media router 164 and the user agent 192 is provided via use of RTP data flows.

FIGS. 4–13B, which are described in detail hereinbelow, are flow charts illustrating sequential call flows and at least one block diagram further illustrating each call flow. With regard to all flowcharts described hereinbelow, a block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

It should be noted that FIGS. 4–13B illustrate use of one session router and one media router. As was mentioned hereinabove, the improved communication network 132 may utilize more than one session router and more than one media router.

Call Setup from PSTN to User Agent

Figure 4A:
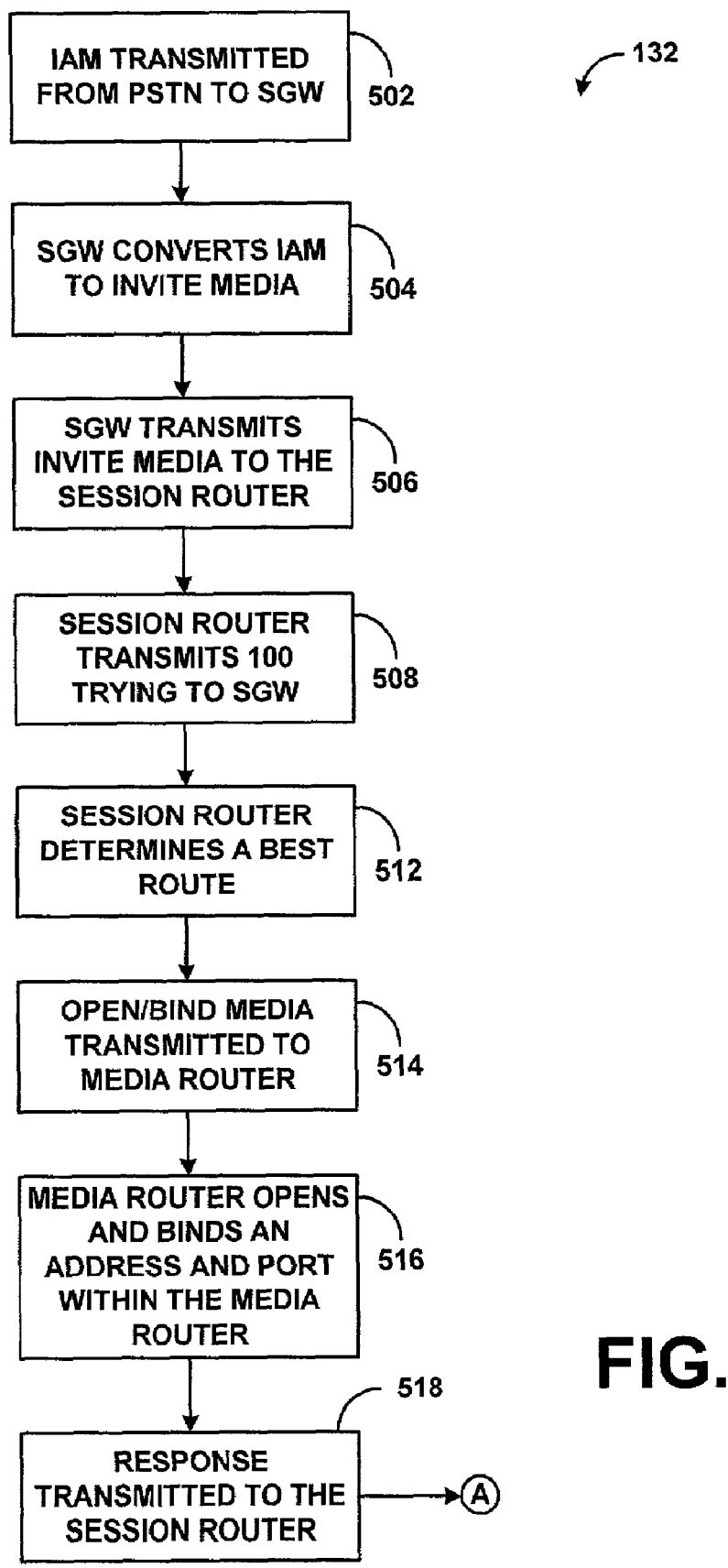
FIG. 4A is a flow chart providing a sequential call flow illustrating a PSTN initiated call setup and execution.
Figure 4B:
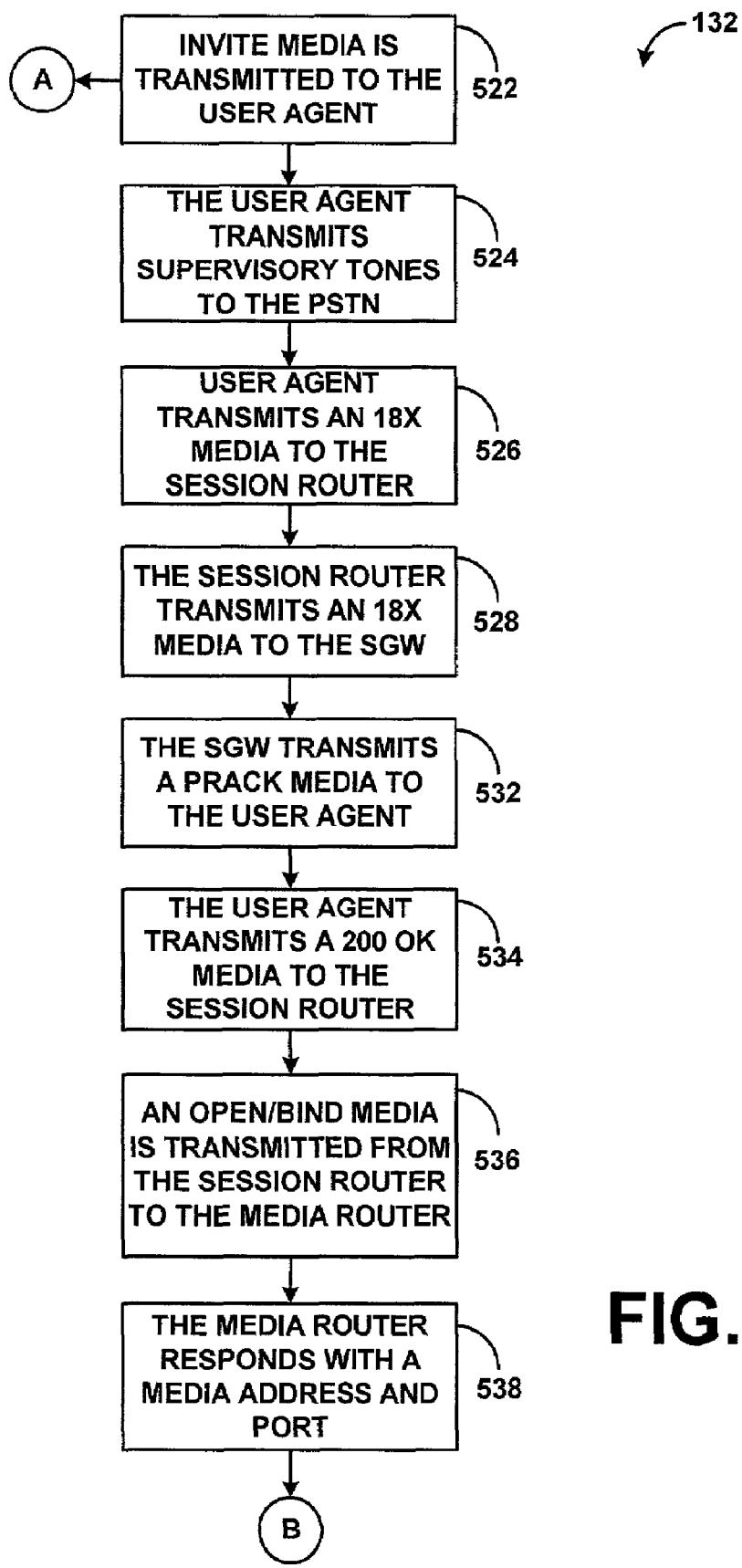
FIG. 4B is a continuation of FIG. 4A.
Figure 4C:
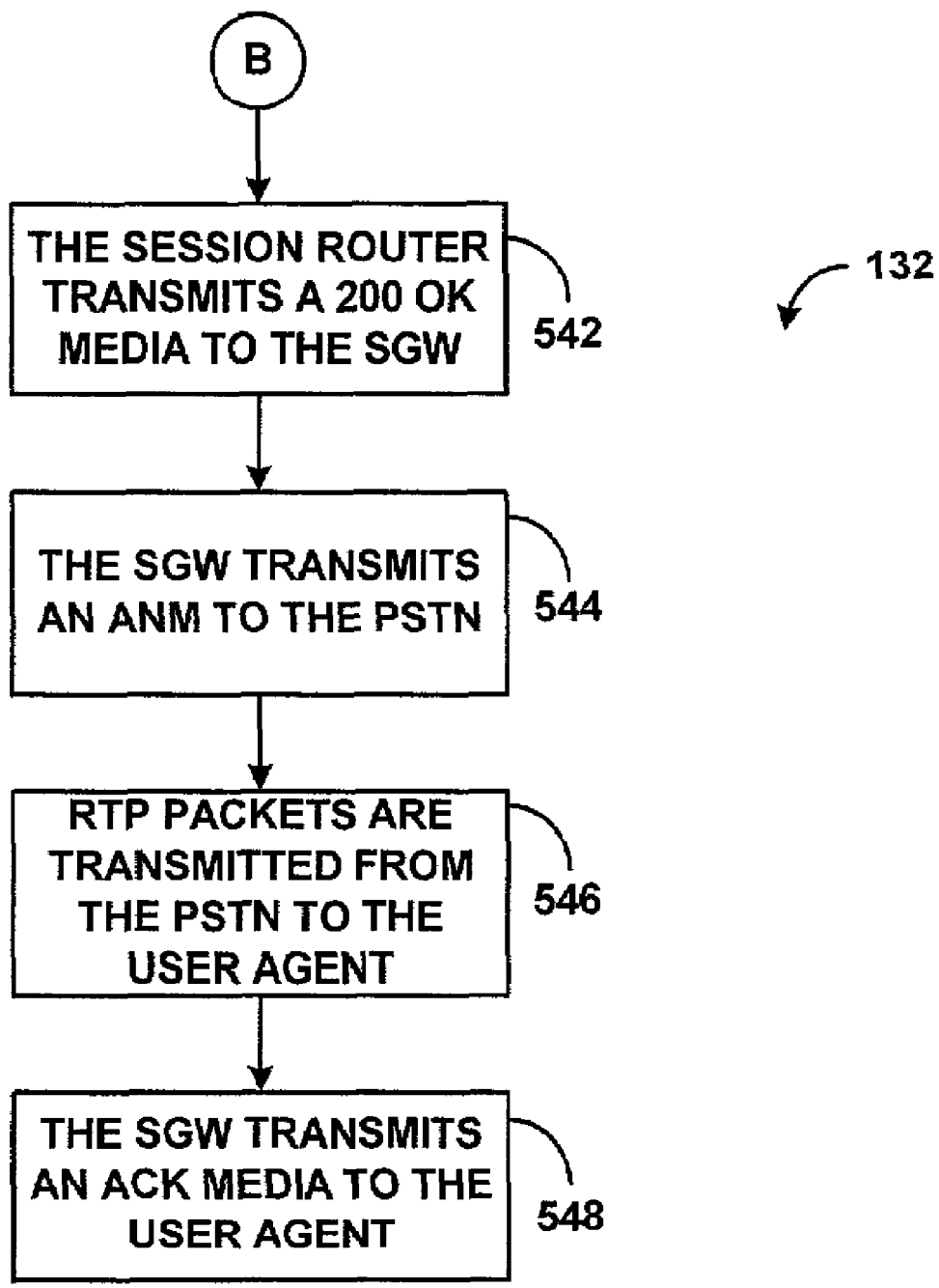
FIG. 4C is a continuation of FIG. 4B.

FIGS. 4A, 4B and 4C are flow charts providing a sequential call flow illustrating a PSTN initiated call setup and execution between the PSTN 134 and the user agent 192 via the SGW 152, session router 162, MGWs 142, 144 and media router 164. It should be noted that the session router 162 and SGW 152 provide signaling capabilities to the improved communication network 132, while the MGWs 142, 144 and media router 164 provide for transmission of multimedia. It should also be noted that two MGWs 142, 144 are illustrated by FIG. 4, merely as an example, while one MGW would suffice.

An initial address message (IAM) is first transmitted from the PSTN 134 to the SGW 152 (block 502). The IAM comprises information necessary to establish a call between the PSTN 134 and the user agent 192. Specifically, the IAM comprises information identifying the calling party, the called party, the nature of connection indicator (NCI), the calling party category (CPC), and the forward call indicators (FCI). The IAM also comprises a circuit identification code (CIC), which identifies a specific bearer channel, or circuit, reserved by the PSTN 134 to carry a call to the user agent 192. It should be noted, that other parameters may be provided by the IAM, examples of which are described in detail within the document entitled "ISUP to SIP Mapping," by Gonzalo Camarillo, et al., dated May 2001, by the Internet Engineering Task Force.

When the IAM message is received by the SGW 152, the SGW 152 converts the IAM to a SIP INVITE message (block 504). During conversion of the IAM to the SIP INVITE message, the composition of information stored within the IAM remains similar and is represented by the SIP INVITE message. As a non-limiting example, the INVITE message comprises a from header that is converted from the IAM calling party, a to header that is converted from the IAM called party, and a session description protocol (SDP) header that is converted from the IAM CIC. The SDP header comprises an IP address and port for the destination user agent 192 to send RTP media. The SGW 152 converts the CIC to a IP address and port by accessing the previously disclosed Table 1. It should be noted that the conversion of the IAM to SIP INVITE requires no external communications or allocations, thus it is algorithmic and self contained in the SGW 152. No communications or associated state machines for managing the resultants are required. The SGW 152 then transmits the INVITE message to the session router 162 (block 506). After receiving the INVITE message, the session router 162 transmits a 100 trying response back to the SGW 152 (block 508) indicating that the session router 162 is handling the call.

Once the session router 162 has received the INVITE message, analysis of the INVITE message is performed so that a best route to the destination user agent 192 may be determined (block 512). An example of a methodology for making this determination is provided by the patent application entitled, "System and Method for Assisting in controlling Real-time Transport Protocol, Flow Through Multiple Networks," by McLampy et al., and filed Apr. 27, 2001, the disclosure of which is incorporated by reference. In a network where there is more than one media router, determination of a best route would further comprise selecting which media router(s) would be utilize in the best route.

An open/bind message is then transmitted from the session router 162 to the media router 164 (block 514), thereby requesting a media router address and port to be dedicated to RTP transmission by the media router 164. The media router 164 then opens and binds a media address and port within the media router 164 to which RTP multimedia packets may be transmitted from the user agent 192 to the PSTN 134 (block 516). A response is then transmitted to the session router 162, providing the session router 162 with the now bound media router address and port address (block 518). Upon completion of this step, the media router 164 now can forward any received RTP packets from the user agent 192 directly to the correct IP address and port on the MGW 142, 144 associated with the PSTN 134 CIC.

As is shown by FIG. 4B, which is a continuation of FIG. 4A, the INVITE message is transmitted from the session router 162 to the user agent 192 (block 522). The INVITE message at this point comprises the media router address and port, instead of the IP address and port that was transmitted from the SGW 152 to the session router 162. Since the user agent 192 now knows addresses and ports of the media router 164, session router 162, SGW 152, and which bearer channel is reserved by the PSTN 134, the user agent 192 is now capable of establishing an RTP multimedia flow back to the PSTN 134. In establishing the RTP multimedia flow back to the PSTN 134, the user agent 192 transmits supervisory tones to the PSTN 134 (block 524), thereby establishing an RTP multimedia path from the user agent 192 to the PSTN 134.

The transmission of multimedia from the user agent 192 to the PSTN 134 is provided via transmission of RTP packets from the user agent 192 to at least one of the MGWs 142, 144. The MGW 142, 144 converts the multimedia from RTP format in the IP network 136 to time division multiplexing format in the PSTN 134. After the MGW 142, 144 has completed conversion, the MGW 142, 144 transmits the received multimedia to the PSTN 134.

The user agent 192 transmits an 18X message to the session router 162 (block 526). The 18X may be a 180 ringing message, a 181 call is being forwarded message, a 182 queued message, or a 183 session in progress message. Most appropriate after the user agent 192 receives the INVITE message is a 180 ringing message to inform the originating PSTN 134 that a transmission path has been established. 18X messages are described in detail within the "ISUP to SIP Mapping" document referred to hereinabove.

The session router 162 then transmits an 18X message to the SGW 152 (block 528). In accordance with the above-mentioned, the 18X message is a 180 ringing message. Once the 18X message is received by the SGW 152, an address complete message (ACM) is transmitted to the PSTN 134.

After receiving the 18X message, the SGW 152 transmits a PRACK message to the user agent 192 (block 532), thereby acknowledging that the 18X message was received. As is known in the art, the PRACK message is a SIP signaling message. The PRACK message is first received by the session router 162, and then is routed by the session router 162, back to the user agent 192.

After the PRACK message is received by the user agent 192, the PRACK message is confirmed. When the user agent 192 answers the call, it transmits a 200 OK message to the session router 162 as well as an SDP address and port that the user agent 192 has designated for listening for the transmission of multimedia from the PSTN 134 (block 534). An open/bind message is transmitted from the session router 162 to the media router 164 (block 536), thereby requesting a media router address and port to be dedicated to RTP transmission by the PSTN 134. The media router 164 opens and binds a media address and port within the media router 164 to which RTP multimedia packets may be transmitted during transmission of multimedia from the PSTN 134. A response is transmitted to the session router 162, providing the session router 162 with the now bound media router address and port address (block 538).

As is shown by FIG. 4C, which is a continuation of FIG. 4B, the session router 162 then transmits a 200 OK message to the SGW 152 identifying the bound media router address and port (block 542). The SGW 152 then transmits an answer message (ANM) to the PSTN 134 (block 544), thereby informing the PSTN 134 that a listening path has been established for RTP multimedia packets to be transmitted from the PSTN 134 to the user agent 192.

RTP multimedia packets are transmitted from the PSTN 134 to the user agent 192 (block 546). This transmission is performed by the PSTN 134 first transmitting the multimedia to a MGW 142, 144. The MGW 142, 144 then converts from TDM format to RTP format and transmits the multimedia to the media router 164 via the bound media router address and port. The multimedia is then transmitted to the user agent 192 on the designated SDP address and port.

The SGW 152 transmits an ACK message to the user agent 192, thereby acknowledging that the addresses for multimedia transmission have been received (block 548). As is known in the art, the ACK message is a SIP signaling message. The ACK message is first received by the session router 162, and then is routed by the session router 162, back to the user agent 192.

Figure 5:
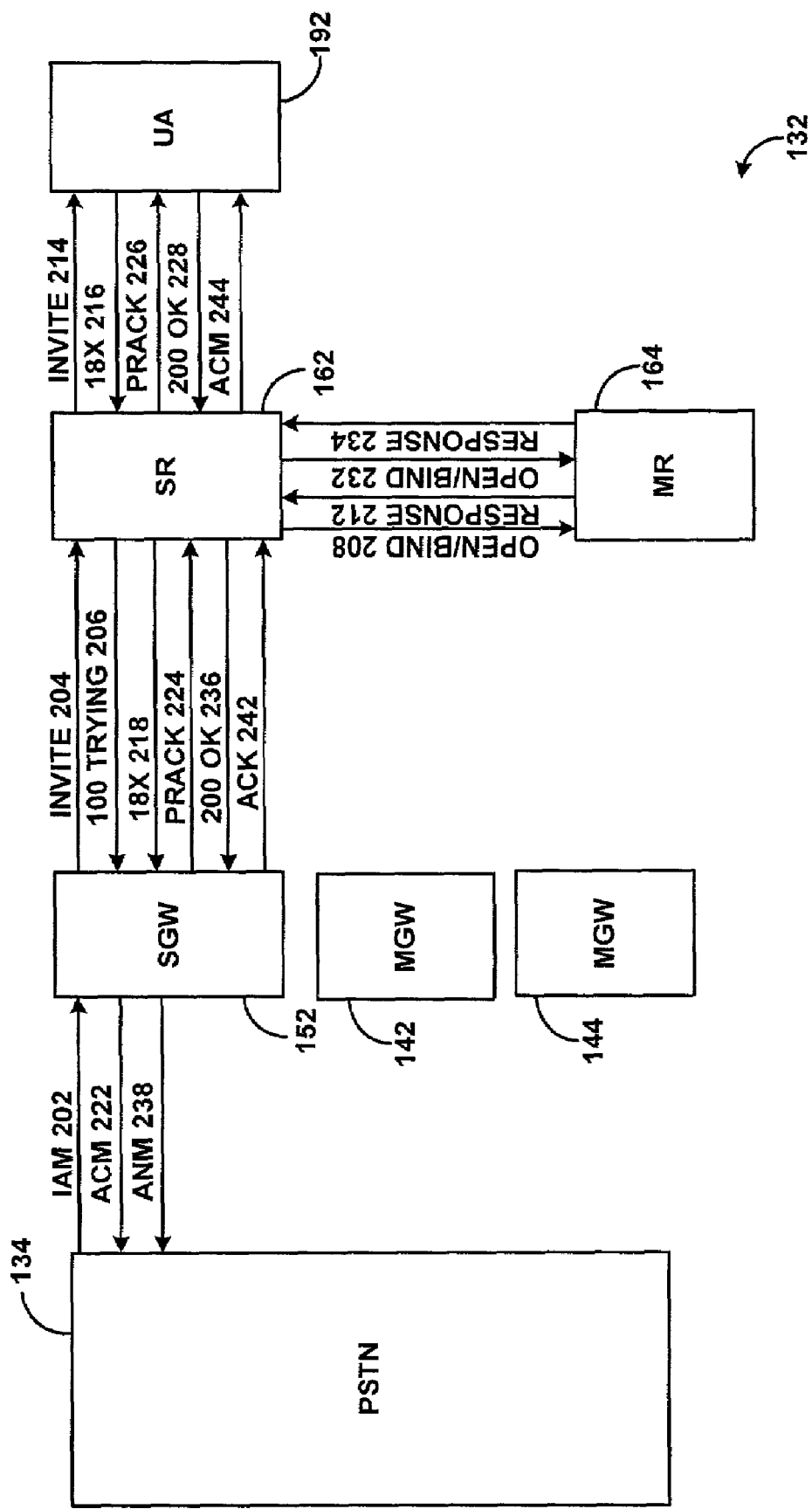
FIG. 5 is a block diagram further illustrating the call sequence described by the flow charts of FIGS. 4A, 4B and 4C.

FIG. 5 is a block diagram further illustrating the call sequence described by the flow charts of FIGS. 4A, 4B, and 4C. As is shown by FIG. 5, the PSTN 134 transmits the IAM to the SGW 152 (reference arrow 202), after which the SGW 152 transmits an INVITE message to the session router 162 (reference arrow 204). The session router 162, in response, transmits a 100 trying message back to the SGW 152 (reference arrow 206). An open/blind request is then transmitted from the session router 162 to the media router 164 (reference arrow 208), after which the media router 164 responds (reference arrow 212). An INVITE message is then transmitted from the session router 162 to the user agent 192 (reference arrow 214). The user agent 192 then transmits an 18X message to the session router 162 (reference arrow 216), which, in turn, transmits an 18X message to the SGW 152 (reference arrow 218). An ACM is then transmitted from the SGW 152 to the PSTN 134 (reference arrow 222), after which a PRACK message is transmitted from the SGW 152 to the session router 162 (reference arrow 224), and then from the session router 162 to the user agent 192 (reference arrow 226).

The user agent 192 then transmits a 200 OK message to the session router 162 (reference arrow 228). The session router 162 transmits an open/bind request to the media router 164 (reference arrow 232), after which a response is transmitted back to the session router 162 (reference arrow 234). A 200 OK message is then transmitted from the session router to the 162 to the SGW 152 (reference arrow 236), after which the SGW 152 transmits an ANM to the PSTN 134 (reference arrow 238). An ACK message is then transmitted from the SGW 152 to the session router 162 (reference arrow 242), after which an ACKNOWLEDGEMENT message is transmitted from the session router 162 to the user agent 192 (reference arrow 244).

A call tear-down may occur in at least one of three different ways, regardless of whether the IP network 136 or the ISUP network 133 initiated the call. The first way of tearing down a call may be for the PSTN 134 to hang up (caller hang up). A second way of tearing down a call may be for the user agent 192 to hang up (called hang up). A third way of tearing down a call may be for the media router 164 to hang up. It should be noted that a call tear-down may also be performed in other ways not described herein.

User Agent Initiates Call Tear-Down

Figure 6:
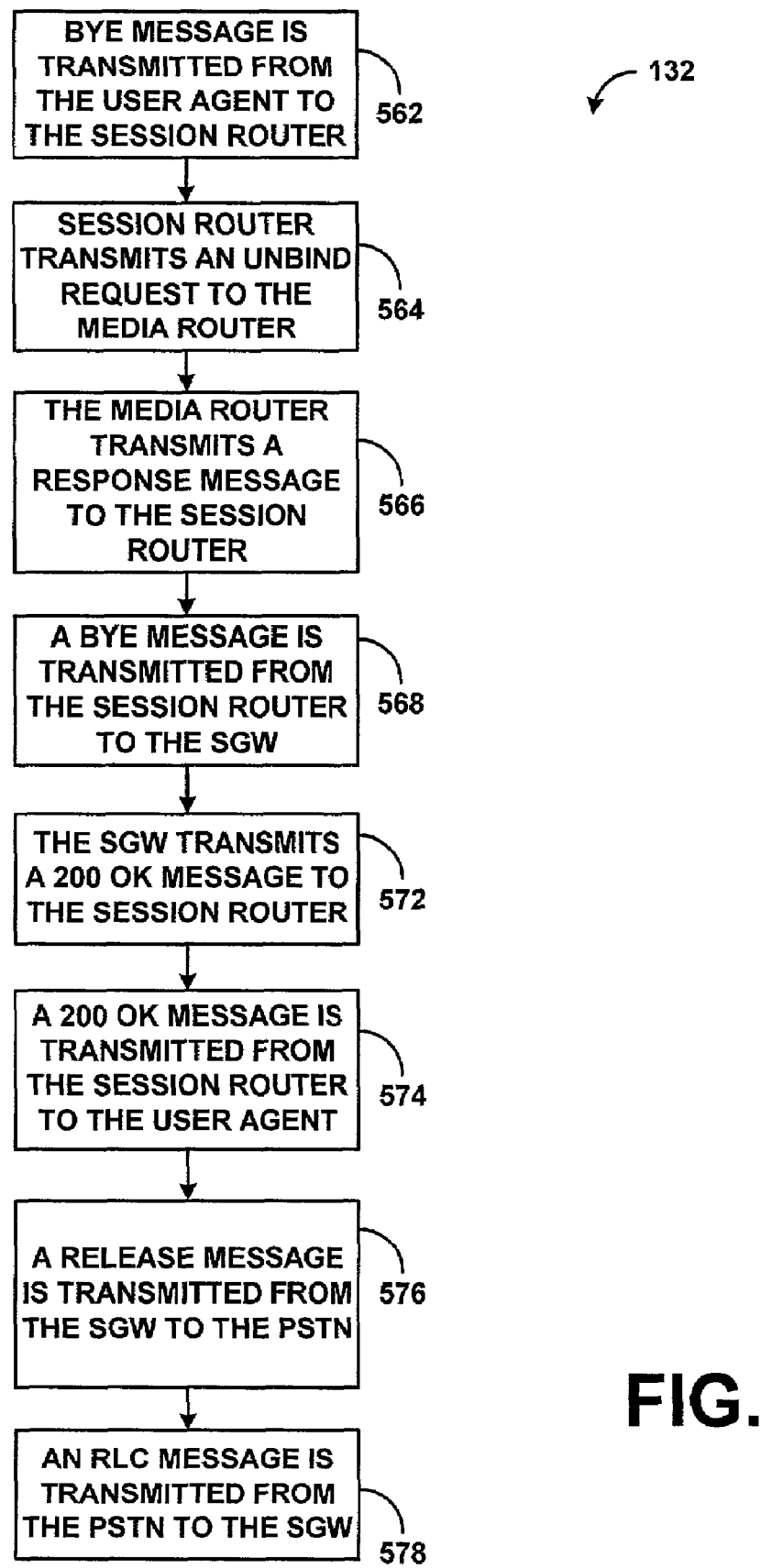
FIG. 6 is a flow chart providing a sequential call flow illustrating a call tear-down between the PSTN and the user agent of FIG. 2, that is initiated by the user agent.

FIG. 6 is a flow chart providing an example of a sequential call flow illustrating a call tear-down between the PSTN 134 and the user agent 192, that is initiated by the user agent 192. As is shown by FIG. 6, a BYE message is transmitted from the user agent 192 to the session router 162 (block 562), thereby requesting a release of prior established connections from the PSTN 134 to the user agent 192. In response, the session router 162 transmits an unbind request to the media router 164 for unbinding of the two prior bound addresses and ports within the media router 164 (block 564). The media router 164 then transmits a response message to the session router 162 confirming release of the two formerly bound media router 164 addresses and ports (block 566).

A bye message is transmitted from the session router 162 to the SGW 152 (block 568), which confirms receipt of the bye message with a 200 OK message that is transmitted back to the session router 162 (block 572). A 200 OK message is then transmitted from the session router 162 to the user agent 192 (block 574) confirming to the user agent that all resources within the media router 164, session router 162 and the SGW 152 are available. A release message is then transmitted from the SGW 152 to the PSTN 134 requesting a release of the bearer channel used for TDM format transmission of multimedia (block 576). The release of resources within the ISUP network 133 is then confirmed with a release complete message (RLC) message that is transmitted to the SGW 152 (block 578).

Figure 7:
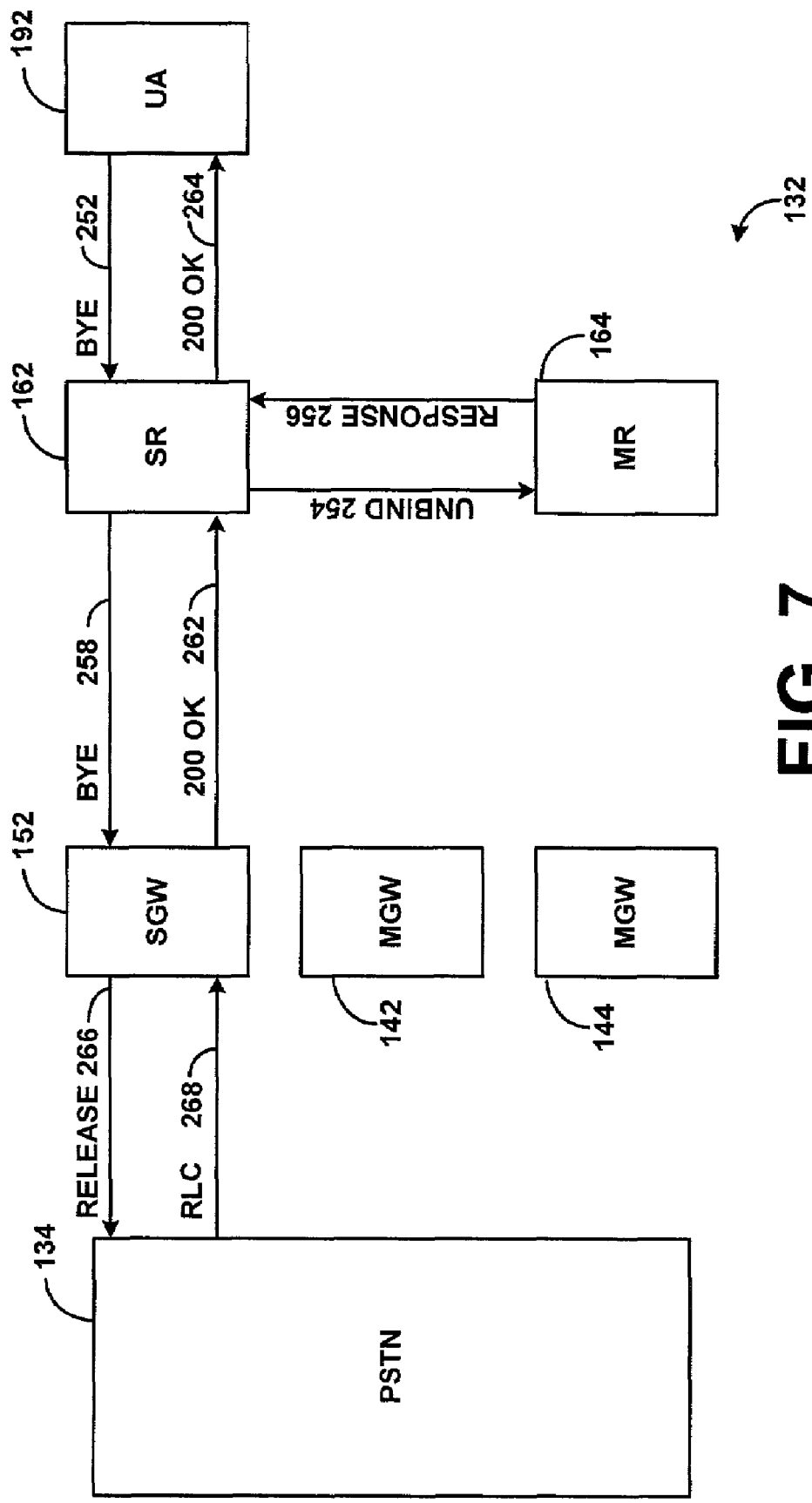
FIG. 7 is a block diagram further illustrating the call sequence described by the flow chart of FIG. 6.

FIG. 7 is a block diagram further illustrating the call sequence described by the flow chart of FIG. 6. As is shown by FIG. 7, a BYE message is transmitted from the user agent 192 to the session router 162 (reference arrow 252). In response, the session router 162 transmits an unbind request to the media router 164 (reference arrow 254). The media router 164 then transmits a response message to the session router 162 (reference arrow 256).

A BYE message is then transmitted from the session router 162 to the SGW 152 (reference arrow 258), which confirms receipt of the bye message with a 200 OK message that is transmitted back to the session router 162 (reference arrow 262). A 200 OK message is then transmitted from the session router 162 to the user agent 192 (reference arrow 264). A release message is then transmitted from the SGW 152 to the PSTN 134 (reference arrow 266). Finally, a release complete message (RLC) is transmitted from the PSTN 134 to the SGW 152 (reference arrow 268).

PSTN Initiated Call Tear-Down

Figure 8:
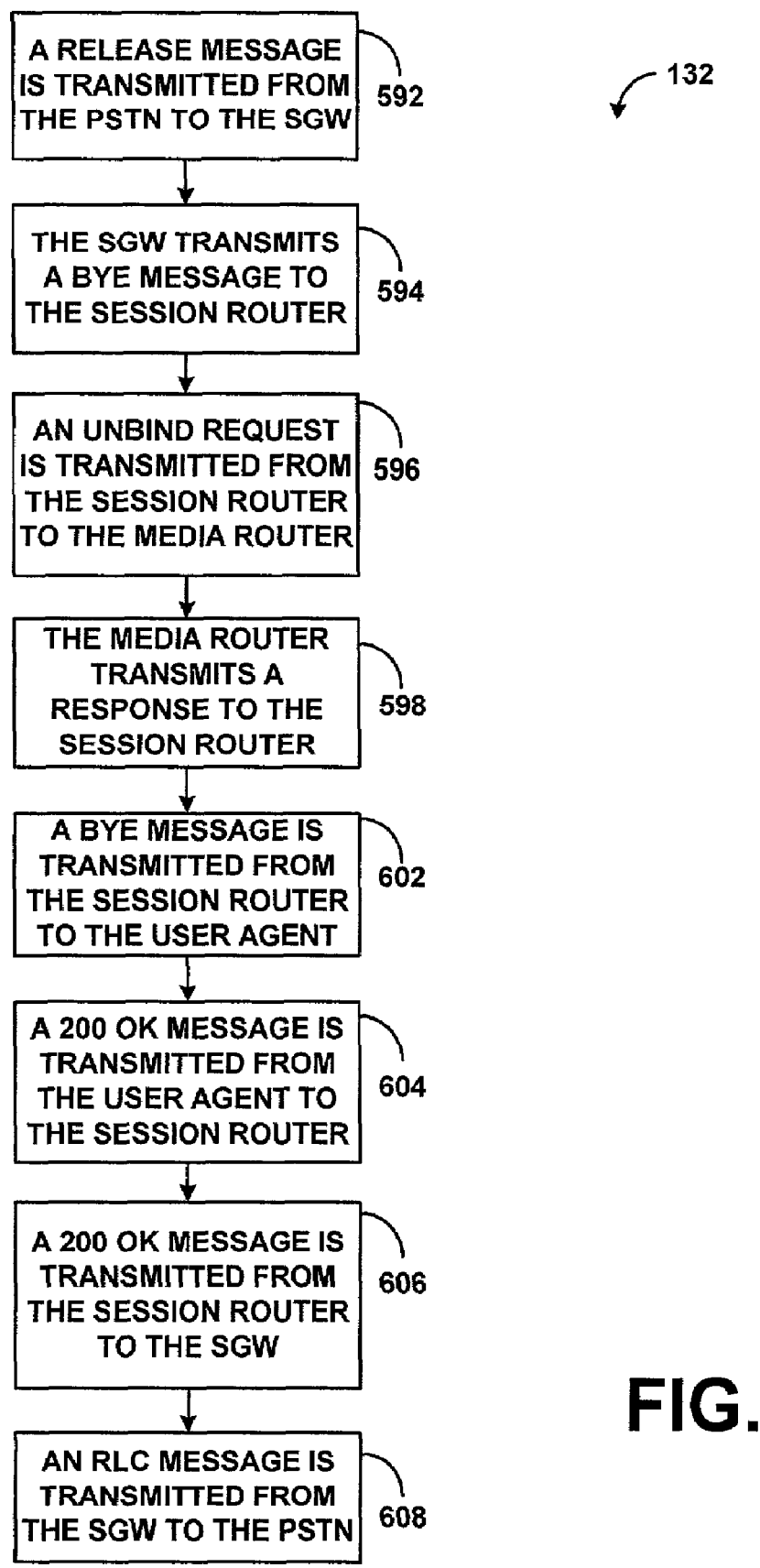
FIG. 8 is a flow chart providing a sequential call flow illustrating a call tear-down between the PSTN and the user agent of FIG. 2, that is initiated by the PSTN.

FIG. 8 is a flow chart providing a sequential call flow illustrating a call tear-down between the PSTN 134 and the user agent 192, that is initiated by the PSTN 134. As is shown by FIG. 8, the tear-down of a call is initiated by a release message that is transmitted from the PSTN 134 to the SGW 152 (block 592). As a result of receiving the release message, the SGW 152 transmits a BYE message to the session router 162 (block 594), thereby requesting a release of prior established connections from the PSTN 134 to the user agent 192.

An unbind request is then transmitted from the session router 162 to the media router 164 (block 596), thereby requesting that both prior established RTP multimedia flows be discontinued by unbinding the media router addresses and ports. The media router 164 then transmits a response message to the session router 162 confirming release of the two formerly bound media router 164 addresses and ports (block 598). A BYE message is then transmitted from the session router 162 to the user agent 192 (block 602), thereby requesting a release of prior established connections from the PSTN 134 to the user agent 192.

Receipt of the BYE message is then confirmed by the user agent 192 via transmission of a 200 OK message that is transmitted back to the session router 162 (block 604). Transmission of the 200 OK message also informs the session router 162 that all resources within the user agent 192 are available for future use. A 200 OK message is then transmitted from the session router 162 to the SGW 152 (block 606) confirming availability of all resources within the media router 164, session router 162 and user agent 192. The release of resources within the SGW 152, session router 162, media router 164 and user agent 192 is then confirmed with an RLC message that is transmitted from the SGW 152 to the PSTN 134 (block 608).

Figure 9:
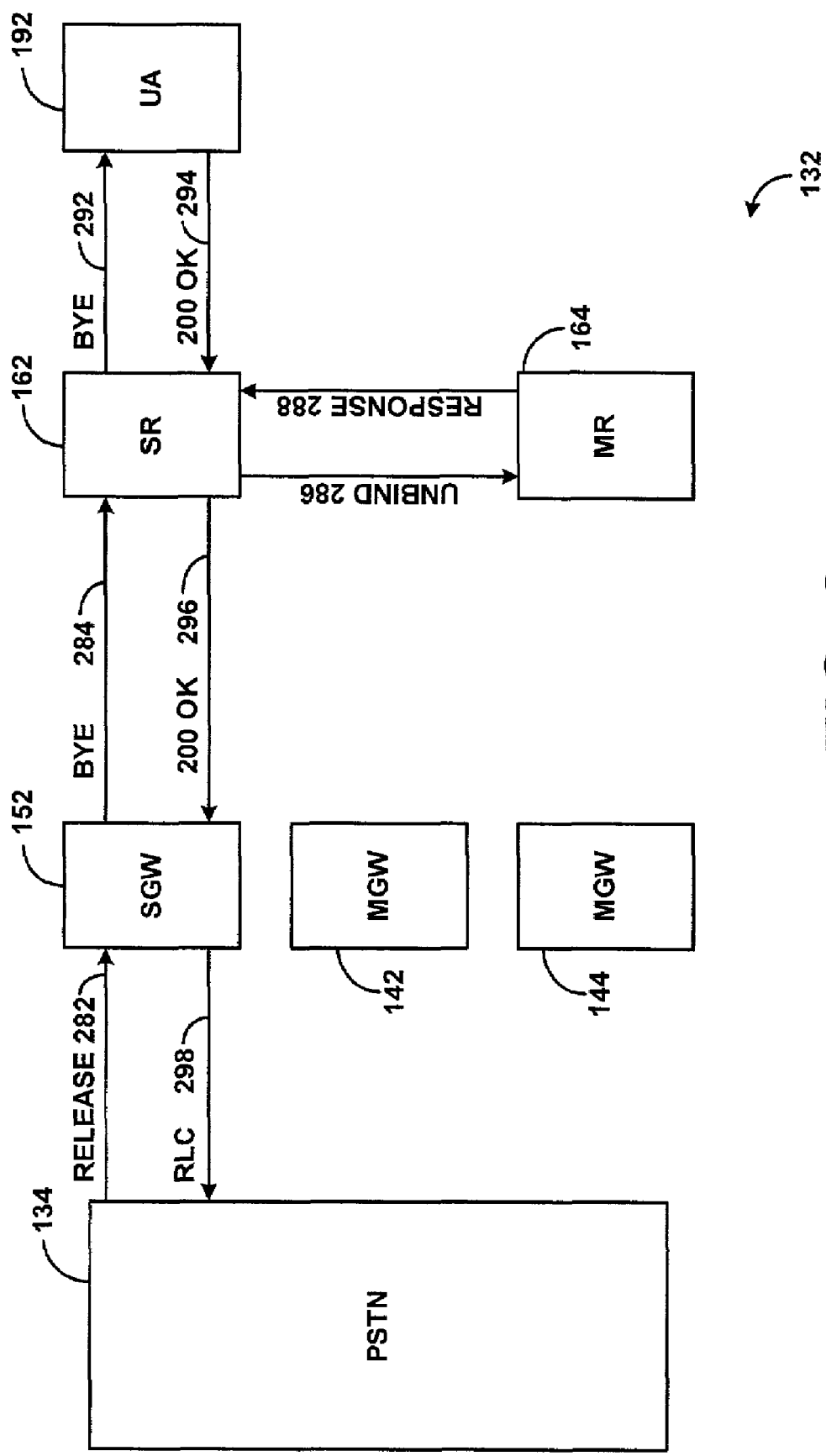
FIG. 9 is a block diagram further illustrating the call sequence described by the flow chart of FIG. 8.

FIG. 9 is a block diagram further illustrating the call sequence of FIG. 8. As is shown by FIG. 9, a release message is transmitted from the PSTN 134 to the SGW 152 (reference arrow 282). As a result of receiving the release message, the SGW 152 transmits a BYE message to the session router 162 (reference arrow 284).

An unbind request is transmitted from the session router 162 to the media router 164 (reference arrow 286). The media router 164 then transmits a response message to the session router 162 (reference arrow 288). A BYE message is then transmitted from the session router 162 to the user agent 192 (reference arrow 292). A 200 OK message is then transmitted from the user agent 192 to the session router 162 (reference arrow 294). A 200 OK message is then transmitted from the session router 162 to the SGW 152 (reference arrow 296). An RLC message is then transmitted from the SGW 152 to the PSTN 134 (reference arrow 298).

Media Router Initiated Call Tear-Down

Figure 10:
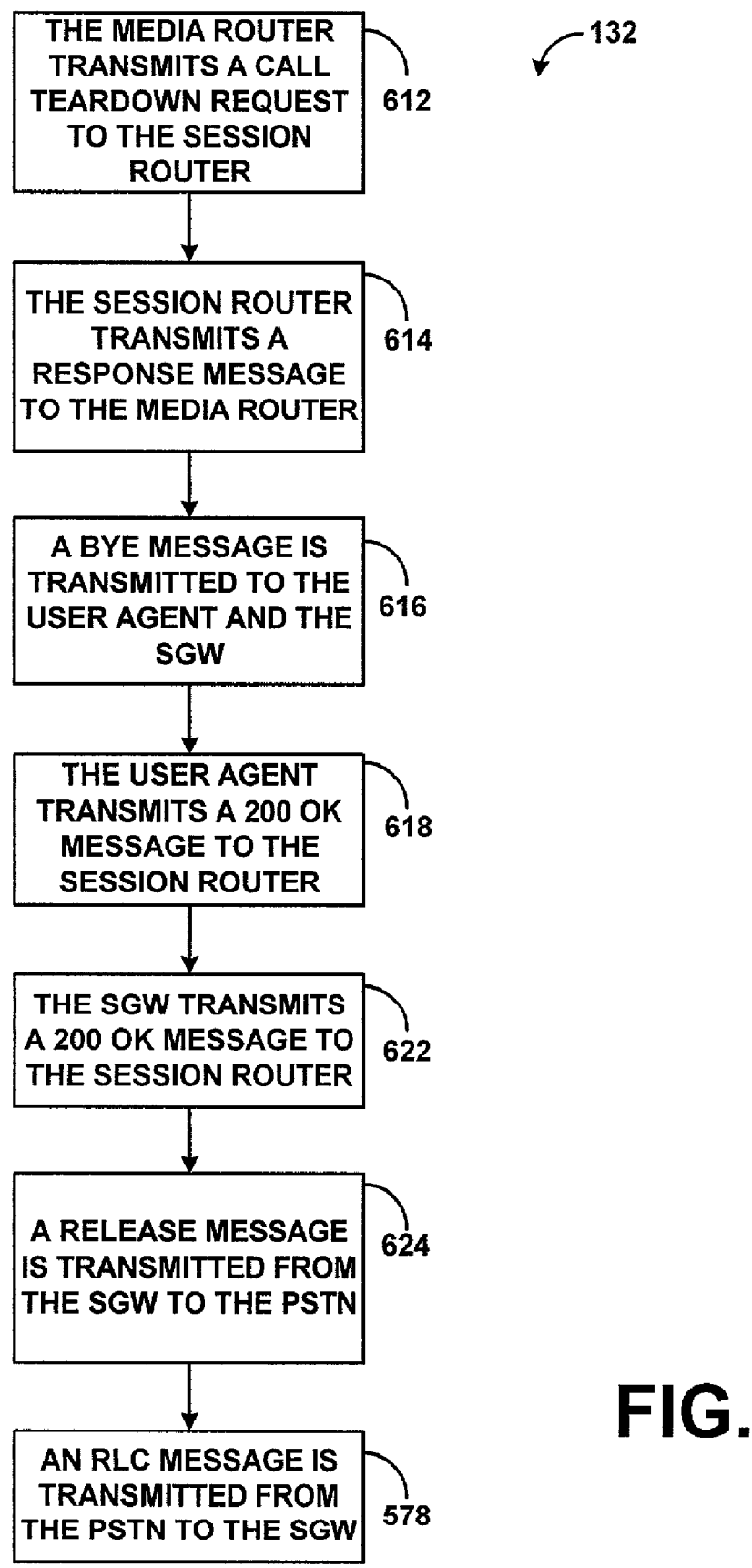
FIG. 10 is a flow chart providing a sequential call flow illustrating a call tear-down between the PSTN and the user agent of FIG. 2, that is initiated by the media router of FIG. 3.

FIG. 10 is a flow chart providing a sequential call flow illustrating a call tear-down between the PSTN 134 and the user agent 192, that is initiated by the media router 164. As is shown by FIG. 10, the media router 164 initiates a call tear-down request that is transmitted to the session router 162 (block 612). In addition to the call tear-down request, the media router 164 unbinds the media router address and port. The call tear-down request is transmitted to the session router 162 since the session router 162 is responsible for signaling within the improved communication network 132. Therefore, the session router 162 is capable of ceasing signaling associated with communication between the PSTN 134 and the user agent 192.

The session router 162 then transmits a response message to the media router 164 (block 614) confirming receipt of the request to cease signaling associated with communication between the PSTN 134 and the user agent 192. The session router 162 then transmits a BYE message to the user agent 192 and the SGW 152 (block 616), thereby requesting a release of prior established connections from the PSTN 134 to the user agent 192 and from the user agent 192 to the PSTN 134. These BYE messages may be transmitted simultaneously, or one before the other. In fact, the order of transmission between the BYE messages may differ, so that either the BYE message to the user agent may be transmitted first, the BYE message to the SGW 152 may be transmitted first, or both BYE messages may be transmitted simultaneously. In other words, transmission of the BYE message to the user agent 192 and to the SGW 152 is two separate transactions that are independent of each other.

Receipt of the BYE message is then confirmed by the user agent 192 via transmission of a 200 OK message that is transmitted back to the session router 162 (block 618). Transmission of the 200 OK message also informs the session router 162 that all resources within the user agent 192 are available for future use. The SGW 152 also transmits a 200 OK message to the session router 162 (block 622) in response to receipt of the BYE message and illustrating the availability of resources within the SGW 152. It should be noted that the order of transmission of the 200 OK messages may differ as well.

A release message is then transmitted from the SGW 152 to the PSTN 134 (block 624) requesting a release of the bearer channel used for TDM format transmission of multimedia. The release of resources within the PSTN 134 is then confirmed with an RLC message that is transmitted from the PSTN 134 to the SGW (block 626).

Figure 11:
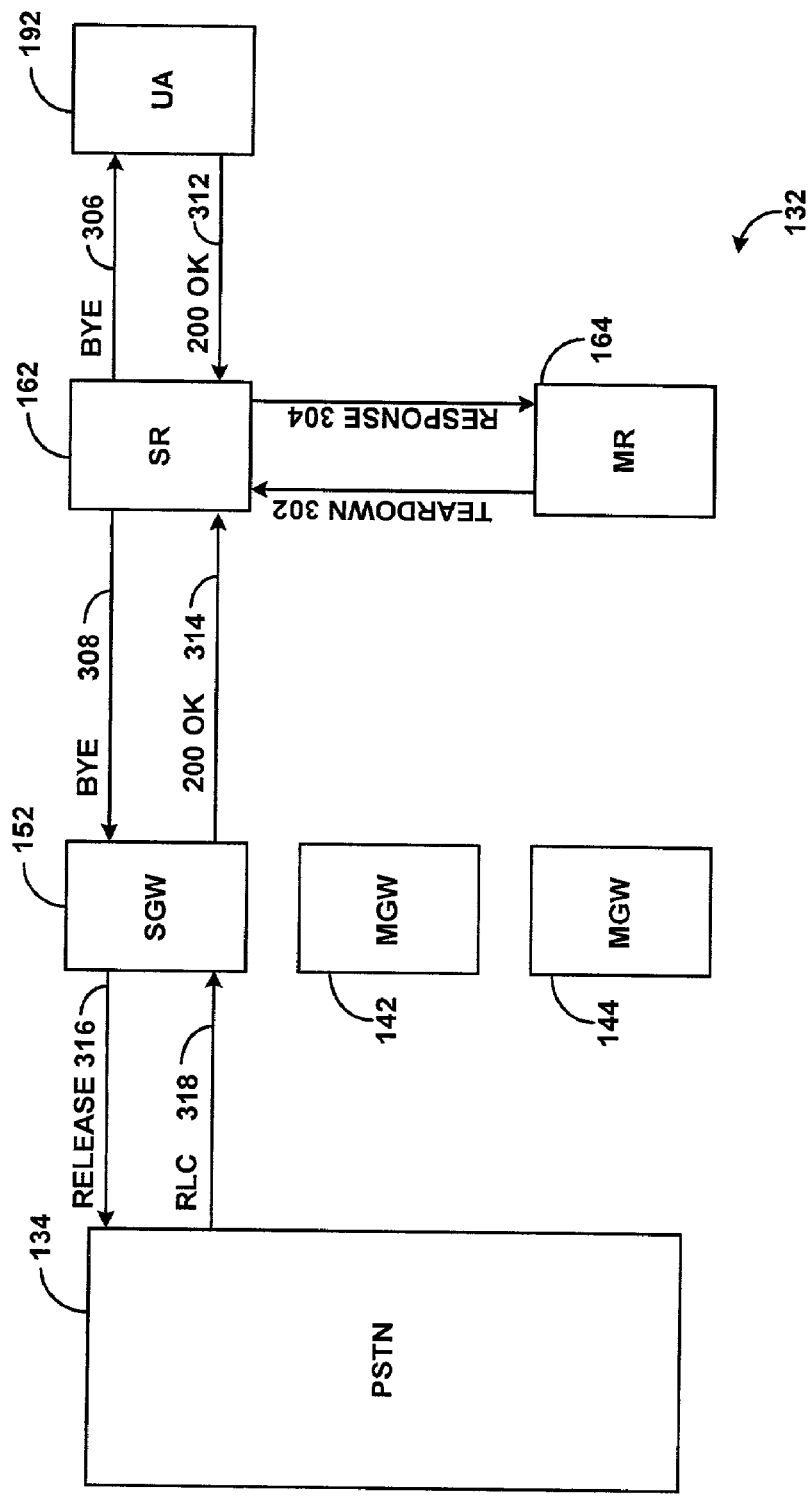
FIG. 11 is a block diagram further illustrating the call sequence described by the flow chart of FIG. 10.

FIG. 11 is a block diagram further illustrating the call sequence described by FIG. 10. As is shown by FIG. 11, the media router 164 initiates a call tear-down request that is transmitted to the session router 162 (reference arrow 302). In addition to the call tear-down request, the media router 164 unbinds the media router address and port. The session router 162 then transmits a response message to the media router 164 confirming receipt of the request to cease signaling associated with communication between the PSTN 134 and the user agent 192 (reference arrow 304). A BYE message is then transmitted to the user agent 192 (reference arrow 306) as well as to the SGW 152 (reference arrows 308).

Receipt of the BYE message is then confirmed by the user agent 192 via transmission of a 200 OK message that is transmitted back to the session router 162 (reference arrow 312). The SGW 152 also transmits a 200 OK message to the session router 162 (reference arrow 314). A release message is then transmitted from the SGW 152 to the PSTN 134 (reference arrow 316). The release of resources within the PSTN 134 is then confirmed with an RLC message that is transmitted from the PSTN 134 to the SGW (reference arrow 318).

User Initiated Call Setup

Figure 12A:
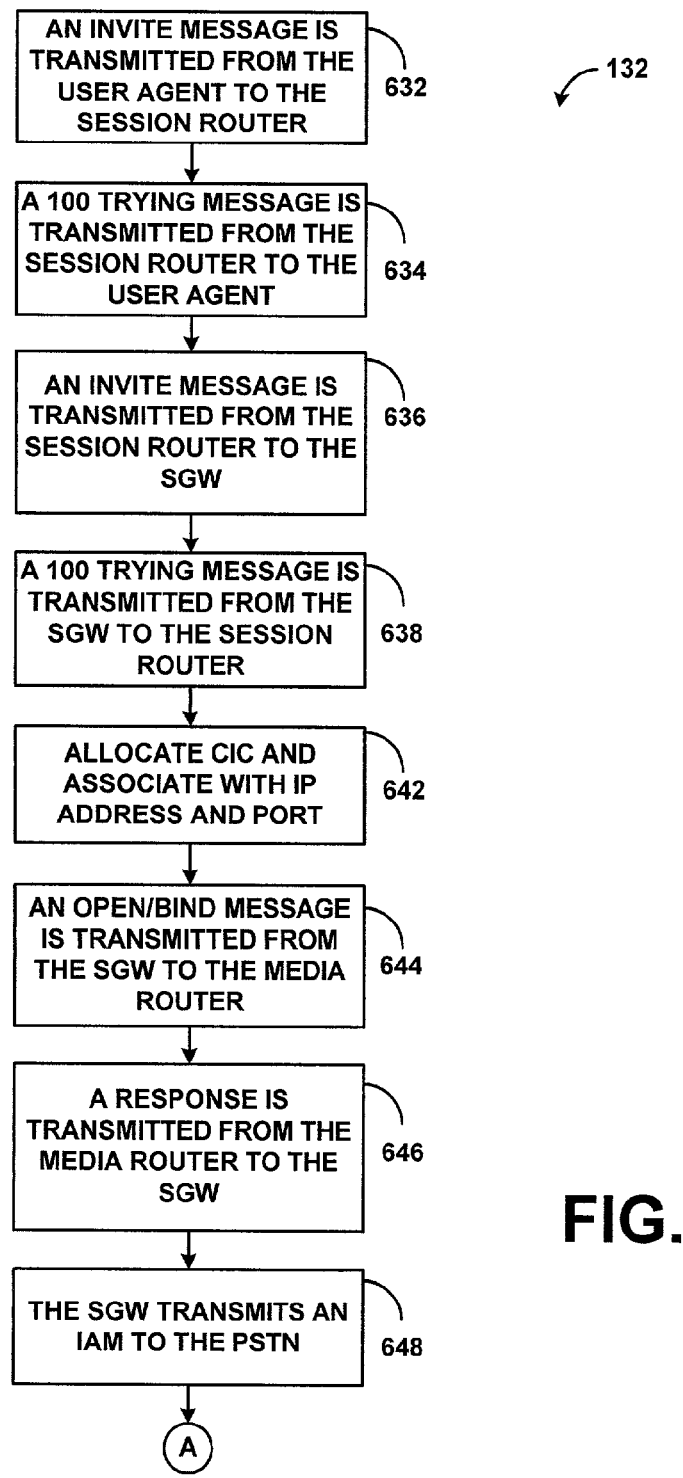
FIG. 12A is a flow chart providing a sequential call flow illustrating a user agent initiated call setup and execution.
Figure 12B:
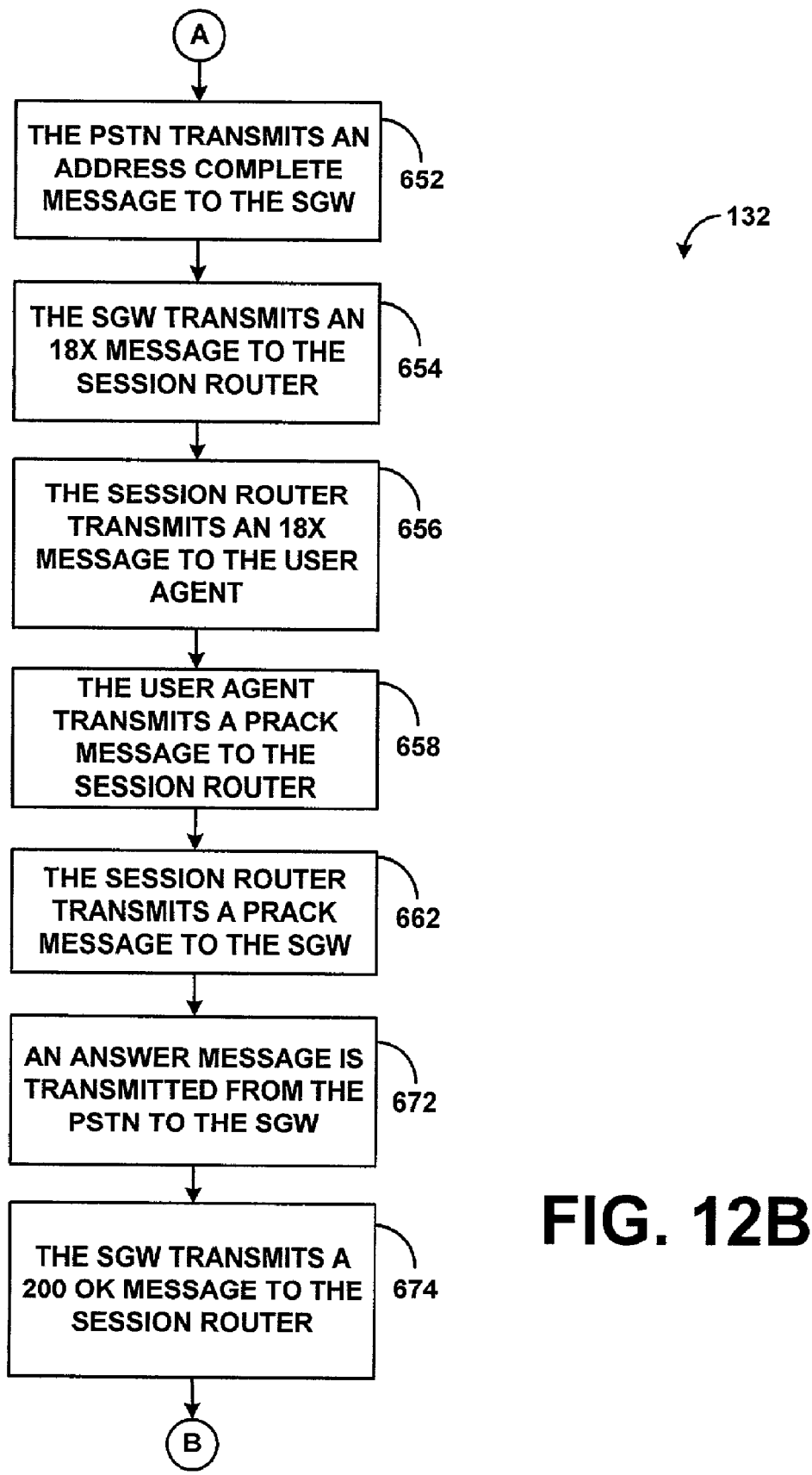
FIG. 12B is a continuation of FIG. 12A.
Figure 12C:
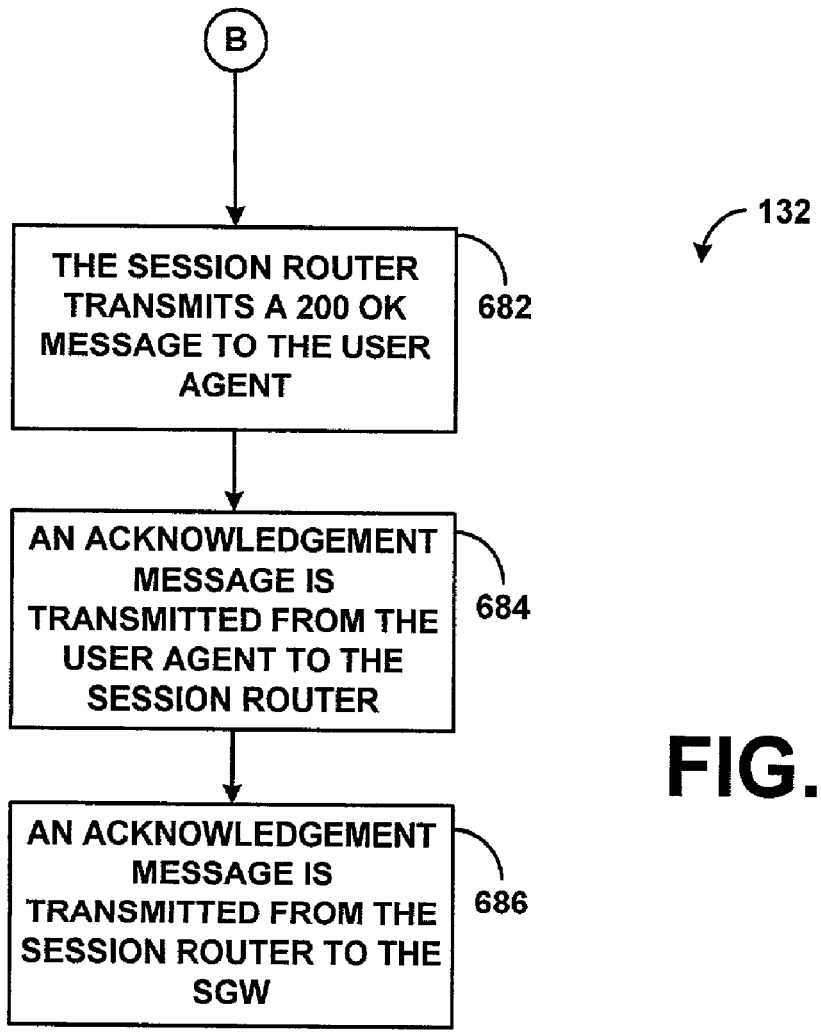
FIG. 12C is a continuation of FIG. 12B.

FIGS. 12A, 12B, and 12C are flow charts providing a sequential call flow illustrating a user agent 192 initiated call setup and execution between the user agent 192 and the PSTN 134 via the session router 162, SGW 152, and media router 164. It should be noted herein that a memory located within the SGW 152 is programmed prior to initiation of the SGW 152 with PSTN channel, or circuit, addresses and the state of the channel. The memory continuously monitors the state of the PSTN channel throughout use of the improved communication network 132, thereby keeping track of which PSTN channels, or communication paths, are available for use. Three states that may be available are, "in service-idle," "in service-busy," and "out of service." As has been mentioned hereinabove, the CIC identifies the channel, or circuit utilized for communication by the PSTN 134. As an example, if a T1 connection has twenty-four circuits, twenty-four CIC's are identified, which are numbered accordingly and associated with a current state.

As is shown by FIG. 12A, a SIP INVITE message is transmitted from the user agent 192 to the session router 162 (block 632). The INVITE message identifies a "from address" that identifies the IP address of the user agent 192 designated for the present call, an IP port that identifies the port of the user agent 192 designated for the present call, and a "to address" that identifies a destination address within the PSTN 134. A 100 TRYING message is then transmitted from the session router 162 to the user agent 192 confirming receipt of the INVITE message (block 634).

A SIP INVITE message is then transmitted from the session router 162 to the SGW 152 (block 636). The INVITE message identifies a "from address" that identifies the IP address of the session router 162 designated for the present call and a "to address" that identifies a destination IP address within the PSTN 134. It should be noted that an open/bind message is not transmitted to the media router 164 immediately after the session router 162 receives the INVITE message since a circuit within the PSTN has not been determined. A 100 TRYING message is then transmitted from the SGW 152 to the session router 162 confirming receipt of the INVITE message (block 638).

As shown in block 642, the SGW 152 then allocates a PSTN circuit or CIC within the MGW 142, 144 for use between the user agent 192 and the PSTN 134. The SGW 152 then selects an idle CIC from its memory to be used for the transmission of media between the user agent 192 and the PSTN 134. Different strategies may be used in assigning an idle CIC for signaling. As an example, the first CIC listed in the memory as idle may be selected. Another strategy may be a round robin strategy, which selects each idle CIC in order, distributing the selection of each CIC evenly over time. Of course, other methods of selection may be utilized. The IP port and address associated with the CIC selected is also determined, by utilizing Table 1 defined hereinabove.

An open/bind message is then transmitted from the SGW 152 to the media router 164 (block 644), thereby requesting a media router address and port to be dedicated to RTP multimedia packet transmission from the user agent 192 to the PSTN 134 and, during response of the PSTN 134, for transmission from the PSTN 134 to the user agent 192. It should be noted that the IP address and port allocated for user agent 192 initiated RTP transmission may be the same IP address and port allocated for PSTN 134 response. The media router 164 then opens and binds an IP address and port within the media router 164 for user agent RTP transmission. It should be noted that only a single open bind request is required, since the SGW 152 knows all of the addresses at this point. This is different from the previous example that used two different open/bind requests.

A response is transmitted to the SGW 152, providing the SGW 152 with the now bound media router address and port address (block 646). The SGW 152 then maps the received SIP INVITE message to an IAM that identifies the user agent 192 and the PSTN 134, and transmits the IAM to the PSTN 134 (block 648). The previously selected idle CIC is also transmitted to the PSTN 134 within the IAM, thereby identifying a CIC to be used for signaling between the user agent 192 and the PSTN 134. At this point, a multimedia path is opened from the SGW 152 to the user agent 192.

As is shown by FIG. 12B, which continues FIG. 12A, the PSTN 134 then indicates that the CIC, and from address and port, are sufficient to set up the call by sending an address complete message to the SGW 152 (block 652). At this point, the PSTN 134 transmits a ringing sound to the MGW, via the established CIC circuit.

The SGW 152 then transmits an 18X message to the session router 162 (block 654). As stated hereinabove, the 18X may be a 180 ringing message, a 181 call is being forwarded message, a 182 queued message, or a 183 session in progress message. Most appropriate after the SGW 152 receives the address complete message is a 180 ringing message to inform the originating user agent 192 that a transmission path has been established.

The session router 162 then transmits an 18X message to the user agent 192, resulting in the user agent receiving a ringing sound (block 656). In accordance with the above-mentioned, the 18X message is a 180 ringing message. After receiving the 18X message, the user agent 192 transmits a PRACK message back to the PSTN 134, thereby acknowledging that the 18X message was received. The PRACK message is first received by the session router 162 (block 658), and then is routed by the session router 162, back to the SGW 152 (block 662).

An ANSWER message is transmitted by the PSTN 134 to the SGW 152 when the PSTN 134 user answers the call (block 672). By reading the CIC associated with the ANSWER message, the SGW 152 is capable of determining which call to which the ANSWER message is responding. Upon receiving the ANSWER message on the allocated port, the SGW 152 transmits a 200 OK message to the session router 162 (block 674).

As is shown by FIG. 12C, which continues FIG. 12B, the session router 162 then transmits a 200 OK message to the previously specified user agent address and the determined user agent port (block 682), thereby completing transmission paths from the user agent 192 to the PSTN 134 and from the PSTN 134 to the user agent 192. Therefore, two-way transmission of multimedia packets is made possible. An ACKNOWLEDGEMENT message is then transmitted from the user agent 192 to the session router 162 (block 684). After which an ACKNOWLEDGEMENT message is transmitted from the session router 162 to the SGW 152 (block 686).

Figure 13A:
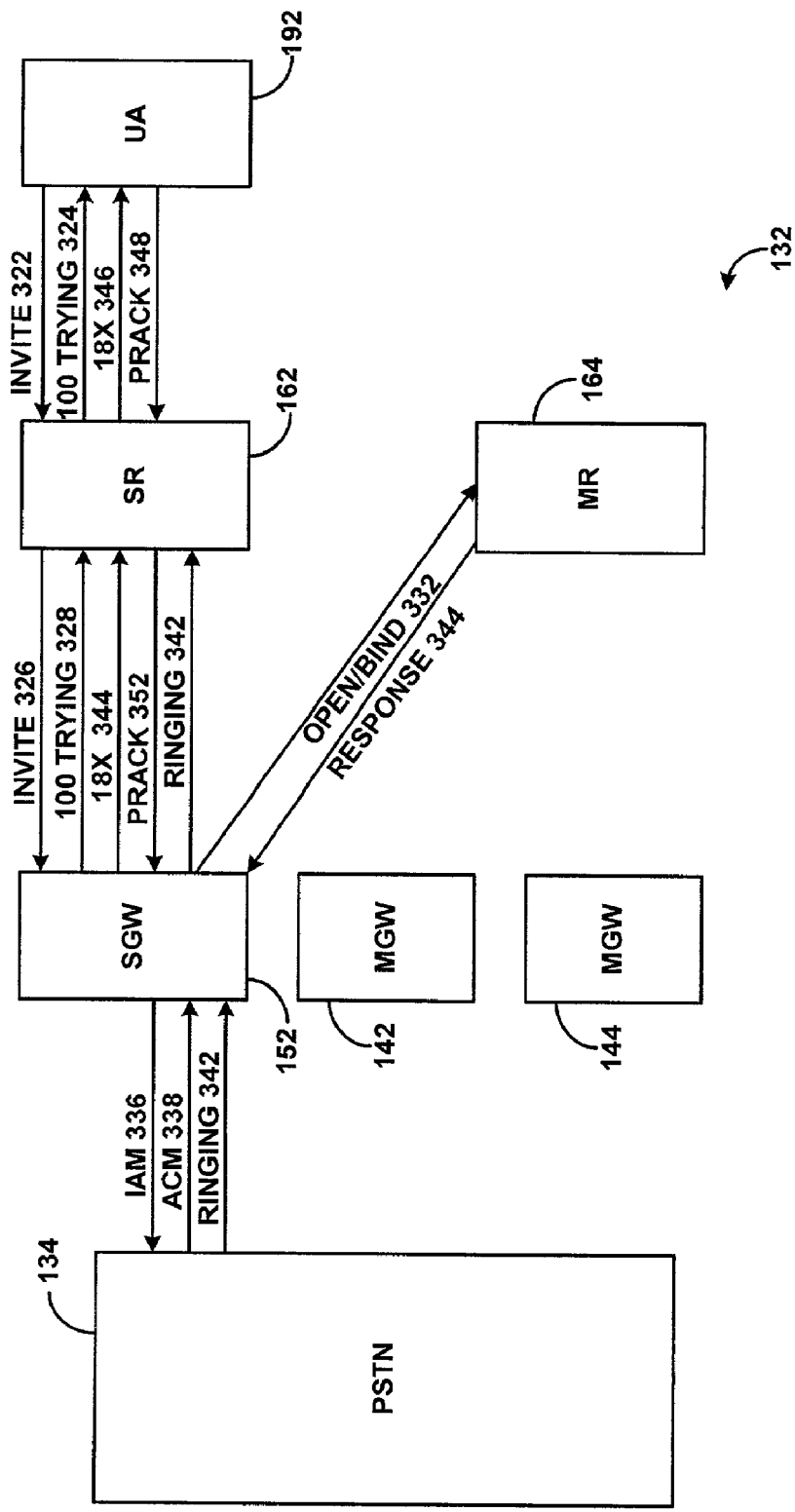
FIG. 13A is a block diagram further illustrating the call sequence described by the flow chart of FIG. 12A.

FIG. 13A is a block diagram further illustrating the call sequence described by the flowchart of FIG. 12A. As is shown by FIG. 13A, a SIP INVITE message is transmitted from the user agent 192 to the session router 162 (reference arrow 322). A 100 TRYING message is then transmitted from the session router 162 to the user agent 192 confirming receipt of the INVITE message (reference arrow 324). A SIP INVITE message is then transmitted from the session router 162 to the SGW 152 (reference arrow 326). A 100 TRYING message is then transmitted from the SGW 152 to the session router 162 confirming receipt of the INVITE message (reference arrow 328).

An open/bind message is then transmitted from the SGW 152 to the media router 164 (reference arrow 332). A response is then transmitted to the SGW 152, providing the SGW 152 with the now bound media router address and port address (reference arrow 334). The SGW 152 then transmits an IAM to the PSTN 134 (reference arrow 336). The PSTN 134 then sends an address complete message to the SGW 152 (reference arrow 338). At this point, the PSTN 134 transmits a ringing sound to the MGW, via the established CIC circuit (reference arrow 342).

The SGW 152 then transmits an 18X message to the session router 162 (reference arrow 344). The session router 162 then transmits an 18X message to the user agent 192 (reference arrow 346). The user agent 192 then transmits a PRACK message to the session router 162 (reference arrow 348), after which the PRACK message is routed by the session router 162, to the SGW 152 (reference arrow 352).

Figure 13B:
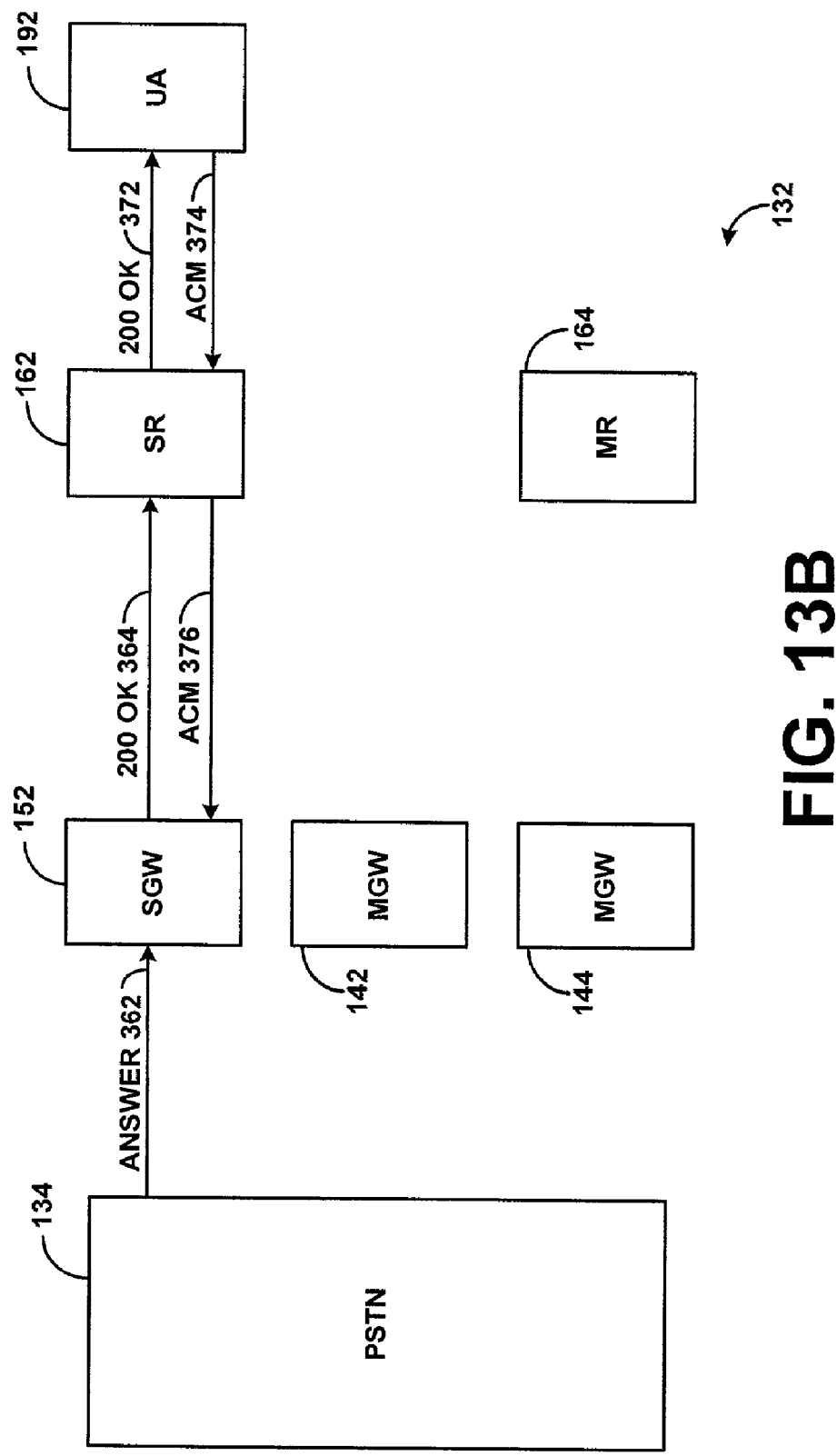
FIG. 13B is a block diagram further illustrating the call sequence described by the flow chart of FIG. 12B and the flow chart of FIG. 12C.

FIG. 13B is a block diagram further illustrating the call sequence described by the flowcharts of FIG. 12B and FIG. 12C. As is shown by FIG. 13B, an ANSWER message is transmitted by the PSTN 134 to the SGW 152 when the PSTN 134 user answers the call (reference arrow 362). Upon receiving the ANSWER message on the allocated port, the SGW 152 transmits a 200 OK message to the session router 162 (reference arrow 364). The session router 162 then transmits a 200 OK message to the previously specified user agent address and the determined user agent port (reference arrow 372). An ACKNOWLEDGEMENT message is then transmitted from the user agent 192 to the session router 162 (reference arrow 374), after which an ACKNOWLEDGEMENT message is transmitted from the session router 162 to the SGW 152 (reference arrow 376).

The communication network 132 of the present invention can be implemented in software, firmware, hardware, or a combination thereof. In the preferred embodiment of the invention, which is intended to be a non-limiting example, a portion of the communication network 132 is implemented in software that is executed by a the media router 164, which may be a computer, for example, but not limited to, a server, a personal computer, work station, minicomputer, or main frame computer.

The software based portion of the improved communication network 132, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A system for improving communication between a switched network and a packet network, comprising:
    a signaling gateway for converting signaling associated with a call between a first protocol and a second protocol;
    at least one media gateway for converting multimedia packets associated with the call between a first format and a second format;
    a media router through which the multimedia packets flow on the way to a destination after conversion by said media gateway; and
    a session router for selecting, for the multimedia packets, at least one route traversing the media router, said selected route ending in the destination, said destination specified by said switched network.

2. The system of claim 1, wherein said first format is a time division multiplexing format and said second format is a real time protocol format.

3. The system of claim 1, wherein said media gateway does not determine the destination of said multimedia.

4. The system of claim 1, wherein said first protocol is signaling system number seven and said second protocol is a session Internet protocol.

5. The system of claim 1, wherein said second protocol is real time protocol.

6. The system of claim 1, wherein said packet network is an Internet protocol network.

7. The system of claim 1, wherein said switched network is a public switched telephone network.

8. The system of claim 1, wherein said first format is a time division multiplexing format.

9. The system of claim 1, wherein said second format is a real time protocol format.

10. The system of claim 1, wherein said switched network communicates with said signaling gateway via use of signaling system number seven.

11. The system of claim 1, wherein said signaling gateway comprises a memory that may be utilized for converting a received circuit identification code into a session description protocol header.

12. The system of claim 11, wherein said session description protocol header is utilized by said destination, located within said packet network, to direct data packets to said media gateway.

13. The system of claim 11, wherein said session description protocol header comprises an Internet protocol address and port for said destination.

14. The system of claim 1, wherein communication between said session router and said signaling gateway is performed via use of session Internet protocol signaling.

15. A system for improving communication between a switched network and a packet network, comprising:
    means for converting signaling associated with a call between a first protocol and a second protocol;
    means for converting multimedia packets associated with the call between a first format and a second format;
    means for guiding said multimedia packets to said destination after conversion by said means for converting multimedia, wherein the multimedia packets flow through the means for guiding on the way to said destination; and
    means for selecting, for the multimedia packets, at least one route traversing the means for guilding said selected route ending in the destination, said destination specified by said switched network.

16. The system of claim 15, wherein said first format is a time division multiplexing format and said second format is a real time protocol format.

17. The system of claim 15, wherein said means for converting multimedia provided in a first format into a second format, and from said second format into said first format, does not determine the destination of said multimedia.

18. The system of claim 15, wherein said first protocol is signaling system number seven and said second protocol is session Internet protocol.

19. The system of claim 15, wherein said second protocol is real time protocol.

20. The system of claim 15, wherein said packet network is an Internet protocol network.

21. The system of claim 15, wherein said switched network is a public switched telephone network.

22. The system of claim 15, wherein said first format is a time division multiplexing format.

23. The system of claim 15, wherein said second format is a real time protocol format.

24. The system of claim 15, wherein said switched network communicates with said signaling gateway via use of signaling system number seven.

25. The system of claim 15, wherein said means for converting signaling in a first protocol into a second protocol, and from said second protocol to said first protocol, further comprises a means for storing that is utilized for converting a received circuit identification code into a session description protocol header.

26. The system of claim 25, wherein said session description protocol header is utilized by said destination located within said packet network to direct data packets to said means for converting multimedia.

27. The system of claim 25, wherein said session description protocol header comprises an Internet protocol address and port for said destination located within said packet network.

28. The system of claim 1, wherein the session router is configured to communicate a port allocation request to the media router, and the media router is configured to allocate, responsive to the request, a port on the media router and to communicate the allocated port to the session router.

29. The system of claim 28, wherein the session router is further configured to communicate the allocated port to the media gateway, and the media gateway is configured to transmit multimedia packets associated with the call to the media gateway using the allocated port.

30. The system of claim 28, wherein the session router is further configured to communicate the port allocation request in response to a signaling message received from the signaling gateway.

31. The system of claim 1, wherein the signaling gateway is configured to convert a Circuit Identification Code (CIC) in an incoming signaling message to an Internet Protocol (IP) address and port in a stateless manner.

32. The system of claim 31, wherein the signaling gateway is further configured to convert the CIC to the IP address and port using a mapping table.

33. The system of claim 32, wherein the IP address and ports in the mapping table correspond to IP addresses and ports located on the media router.

34. The system of claim 15, wherein the means for selecting is configured to communicate a port allocation request to the means for guiding, and the means for guiding is configured to allocate, responsive to the request, a port on the means for guiding and to communicate the allocated port to the means for selecting.

35. The system of claim 34, wherein the means for selecting is further configured to communicate the allocated port to the means for guiding, and the means for guiding is configured to transmit multimedia packets associated with the call to the means for converting multimedia using the allocated port.

36. The system of claim 34, wherein the means for selecting is further configured to communicate the port allocation request in response to a signaling message received from the means for converting signaling.

37. The system of claim 15, wherein the means for converting signaling is configured to convert a Circuit Identification Code (CIC) in an incoming signaling message to an Internet Protocol (IP) address and port in a stateless manner.

38. The system of claim 37, wherein the means for converting signaling is further configured to convert the CIC to the IP address and port using a mapping table.

39. The system of claim 38, wherein the IP address and ports in the mapping table correspond to IP addresses and ports located on the media router.

40. A method for improving communication between a switched network and a packet network, comprising the steps of:
    converting signaling associated with a call between a first protocol and a second protocol;
    converting multimedia packets associated with the call between a first format and a second format;
    guiding said multimedia packets to said destination after conversion by said means for converting multimedia, wherein the multimedia packets flow through the means for guiding on the way to said destination; and
    selecting, for the multimedia packets, at least one route traversing means for guiding said selected route ending in the destination, said destination specified by said switched network.

41. The method of claim 40, further comprising the steps of:
    communicating a port allocation request;
    allocating a port for routing of the multimedia packets, responsive to the request; and
    communicating the allocated port to the requester.

42. The method of claim 41, further comprising the step of:
    transmitting multimedia packets associated with the call using the allocated port.

43. The method of claim 41, further comprising the step of:
    communicating the port allocation request in response to a received signaling message.

44. The method of claim 40, wherein the converting signaling step further comprises:
    converting a Circuit Identification Code (CIC) in an incoming signaling message to an Internet Protocol (IP) address and port in a stateless manner.

* * * * *